US010958050B2

(12) United States Patent
Gooding

(10) Patent No.: US 10,958,050 B2
(45) Date of Patent: Mar. 23, 2021

(54) PROTECTIVE COVERS FOR CONDUITS SUCH AS CABLES AND/OR HOSES

(71) Applicant: Fuchs Petrolub SE, Mannheim (DE)

(72) Inventor: David Patrick Charles Herbert Gooding, Maltby (GB)

(73) Assignee: Fuchs Petrolub SE, Mannheim (DE)

( * ) Notice: Subject to any disclaimer, the term of this patent is extended or adjusted under 35 U.S.C. 154(b) by 0 days.

(21) Appl. No.: 16/639,775

(22) PCT Filed: Aug. 23, 2017

(86) PCT No.: PCT/EP2017/071238
§ 371 (c)(1),
(2) Date: Feb. 18, 2020

(87) PCT Pub. No.: WO2019/037845
PCT Pub. Date: Feb. 28, 2019

(65) Prior Publication Data
US 2020/0203939 A1    Jun. 25, 2020

(51) Int. Cl.
*H02G 3/02*    (2006.01)
*H02G 3/04*    (2006.01)
(Continued)

(52) U.S. Cl.
CPC ............ *H02G 3/0481* (2013.01); *F16L 57/06* (2013.01); *H02G 9/08* (2013.01); *H02G 15/1813* (2013.01)

(58) Field of Classification Search
CPC ... H01B 7/02; H01B 7/04; H01B 7/28; H01B 7/282
(Continued)

(56) References Cited

U.S. PATENT DOCUMENTS 2,946,840 A * 7/1960 Palmer ...................... H02G 7/00
174/136
3,060,069 A * 10/1962 Sindars ................. F16L 59/022
138/120
(Continued)

FOREIGN PATENT DOCUMENTS

DE    195 05 983    8/1996
DE    29710582    9/1998
(Continued)

*Primary Examiner* — William H. Mayo, III
(74) *Attorney, Agent, or Firm* — Gudrun E. Huckett

(57) ABSTRACT

A protective cover for surrounding a conduit assembly in a mine has a flexible elongate main body that comprises a plurality of discrete functional layers and which is configurable as a sleeve having an outer surface, the protective cover comprising a first layer, substantially comprised of an aramid based material, that is structurally configured to provide substantial protection from the force associated with impacting projectiles originating from the external environment whilst also being configured to substantially resist internally generated forces of the type that are typically associated with a burst hose, a second layer, adjacent to the outer surface of the first layer, that is structurally configured in the form of a mesh thereby protecting the first layer from external bodies that may otherwise potentially induce tear damage to the first layer, the protective cover characterised by further comprising a third layer, adjacent to said first layer, comprising a polymeric membrane that is substantially impermeable to the passage of at least one liquid. There is also provided a system for protecting at least one or a plurality of cables and/or hoses from matter falling from above, said system comprising use of at least one such protective cover suspended from a flexible strand that is in turn attached to a fixed structure that is located substantially vertically above said at least one or a plurality of cables and/or hoses.

34 Claims, 16 Drawing Sheets

(51) Int. Cl.
*F16L 57/06* (2006.01)
*H02G 9/08* (2006.01)
*H02G 15/18* (2006.01)

(58) Field of Classification Search
USPC ......... 174/36, 74 R, 74 A, 82; 428/100, 192, 428/193, 36.9–36.92; 52/210, 243
See application file for complete search history.

(56) References Cited

U.S. PATENT DOCUMENTS

| | | | | |
|---|---|---|---|---|
| 3,762,982 | A * | 10/1973 | Whittington | H01B 7/1855 428/377 |
| 3,847,183 | A * | 11/1974 | Meyer | B29C 61/0608 138/96 R |
| 3,962,554 | A * | 6/1976 | Eigel | H02G 15/06 174/74 A |
| 4,194,082 | A * | 3/1980 | Campbell | B29C 61/0616 156/86 |
| 5,300,337 | A * | 4/1994 | Andrieu | A44B 18/0069 428/36.1 |
| 5,516,985 | A * | 5/1996 | Merkel | H02G 15/043 174/74 A |
| 5,556,495 | A * | 9/1996 | Ford | D06C 7/02 156/148 |
| 5,965,223 | A * | 10/1999 | Andrews | A41D 19/01511 428/34.5 |
| 6,205,623 | B1 * | 3/2001 | Shepard | A44B 18/0049 24/30.5 R |
| 6,280,546 | B1 * | 8/2001 | Holland | B32B 27/12 156/85 |
| 8,502,069 | B2 * | 8/2013 | Holland | H02G 15/18 174/36 |
| 2002/0170728 | A1 | 11/2002 | Holland et al. | |
| 2004/0222013 | A1 | 11/2004 | Lindner | |
| 2005/0036276 | A1 | 2/2005 | Lindner | |
| 2013/0315675 | A1 | 11/2013 | Pajak et al. | |
| 2017/0327059 | A1 | 11/2017 | Miyamura et al. | |

FOREIGN PATENT DOCUMENTS

| | | |
|---|---|---|
| DE | 103 54 487 | 6/2005 |
| EP | 1437264 | 7/2004 |
| EP | 1493553 | 1/2005 |
| ES | 2217140 | 11/2004 |
| FR | 2990493 | 11/2013 |
| GB | 2 330 458 | 4/1999 |
| GB | 2513759 | 11/2014 |
| WO | 02/095891 | 11/2002 |

\* cited by examiner

PROTECTIVE COVERS FOR CONDUITS SUCH AS CABLES AND/OR HOSES

FIELD OF THE INVENTION

The present invention relates to an improved protective cover for conduits such as cables and/or hoses and more particularly, but not exclusively the present invention relates to a protective cover and to a system configured to protect overhead cables and/or hoses from debris and liquid falling under gravity from the roof of an underground mine.

BACKGROUND OF THE INVENTION

As is known to those skilled in the art, guards in the form of protective covers exist or conduits of various types as used in highly abrasive environments. Such guards or covers typically comprise a cylindrical sleeve that of a suitable size for a given application to thereby substantially surround and encase, as appropriate, one or more conduits. The term 'conduit' as used herein refers to an elongate member that is configured to transmit something. Thus typical examples of conduits of the type of interest herein comprise hoses, cables, wires, tubing and the like. The term 'conduit assembly' is defined and used herein as either a single conduit or a plurality of conduits as used in close proximity to one another and thus the term is to be understood herein as expressly including either a single conduit or a plurality of such conduits. Furthermore respective conduits may be configured as distinct elongate members that are thus not formed as part of or otherwise integrally connected to another conduit or they may be integral with one or more other conduits.

An example of such a protective cover or guard and an abrasion resistant cable or hose system is that described and filed by the applicant JHRG LLC in international patent application, publication number WO 2002095891 (Holland) entitled 'Protective Cover'. The protective cover described in WO 2002095891 comprises a sleeve surrounding the cable or hose that has open ends. The sleeve is described as resistant to petroleum-based products and formed from an elongated sheet of fabric that comprises high strength yarns and which further comprises opposing longitudinal edges that can be releasably attached to each other using, for example, hook and loop material such as VELCRO®.

According to WO 2002095891 the high strength yarn is selected from the group consisting of long chain polyethylenes, high strength aramids, liquid crystal polymers, and combinations thereof. Further securing means in the form of grommets are described for securing the open ends of the sleeve to the cable or hose and additional bands ('coverlets') that are to be wrapped around hoses or cables at spaced-apart intervals are described as appropriate for certain applications.

Notably the protective cover of WO 2002095891 is described at paragraph [0001] thereof as providing protection for hoses and cables as they are dragged across abrasive surface such as concrete and asphalt, in environments such as airports and the like. Thus the protective covers described are primarily intended for use on the ground or on whatever surface any hoses and cables to be protected are deployed on.

There are various industrial situations, such as, for example, in underground mines, where, in contrast to the situations of primary concern in WO 2002095891, it is undesirable to have cables and/or hoses on the surface of the ground (i.e. at foot level) where given industrial operations are taking place.

Specific Example—Problems Associated with Mining Roof Support Inter-Chock Hydraulic Hose and Cables FIG. 1 schematically illustrates a prior art overhead cable system 100 as used in a typical UK coal mine comprising floor 101, roof (or ceiling) 102 that includes roof joists and coal face 103. As is known to those skilled in the art of mining, it is highly desirable, in view of the limited available space at foot level in a tunnel or an atrium of an underground mine, to position a conduit assembly, above the area where workers and machinery are transported around. In the example illustrated roof 102 as typically comprises series of roof joists is supported by chocks (powered supports, generally in the form of large hydraulic jacks) and it is usually the case that so-called 'inter-chock' cables and/or hoses run there-between. Although abrasion associated with movement of such cables/hoses on the floor of an underground tunnel or atrium is thereby negated by virtue of the cables/hoses being above floor level, as will be appreciated by those skilled in the art there still exist abrasive factors with such overhead conduits. Chock 104 comprises of a pair of vertical hydraulic cylinders 106, 107 supported on base 108 which thereby support a canopy 109 that is in contact with roof 102. Similarly the chock 105 comprises respective hydraulic cylinders 110, 111, base 112 and canopy 113.

As illustrated, conduit assembly 114 is positioned overhead, that is above the head height of operatives working below and, in the example illustrated, comprises a protective sleeve like cover 115 that encases conduit assembly 114. Conduit assembly 114 with cover 115 is suspended from the respective canopies 109, 113 by respective wire loop hangers 116 and 117 as are attached to each respective canopy at points 118 and 119. Each respective hanger 116, 117 is typically made of a high tensile wire that is suitably affixed to its associated canopy and which, at its other (lower) end, comprises a terminal loop that, as shown, encircles conduit assembly 114.

In the mining industry a known conduit assembly cover 115 may take various forms. Typically, in the UK mining industry, a basic guard in the form of a cover is used which is substantially made of a polyamide cloth, such as of nylon. However, for certain applications, it has been known in the UK mining industry to configure assembly 114 with a more robust cover comprising an outer layer of an impact resistant steel mesh and an inner layer of a polyamide cloth, such as of nylon, with an impact resistant high strength aramid-based layer located there-between. Such covers are desirable in order to try and protect a given conduit assembly against falling debris such, in the example of FIG. 1, fallen boulder 120 on assembly 114 and rock pile 121 on floor 101 as have each originated via a rock fall/roof collapse as is generally indicated at region 121 of the mine roof 102.

Thus a problem associated with such overhead conduits is the damage caused through abrasion with falling debris and liquid, notably water, from the roof of the tunnel or atrium. As is known to those skilled in the art of coal mining in the United Kingdom such abrasion from debris and water from above may be alleviated through using protective covers that are configured in a similar manner to those described in WO 200209589 or using the aforementioned. Nevertheless covers as are used to protect overhead conduits suffer from additional complications as compared with covers configured for use at ground level. In this regard, for example, the weight of the covers themselves may be problematic in that they may constitute substantial extra weight to be supported by the conduits that are being protected. This extra weight that has to be supported is particularly problematic in large mines as are found in various countries around the world such as, for example, in Australia, South Africa and in the USA. In such large mines and large underground caverns/ structures there is thus a tendency for protective covers, even of a very basic kind, not to be used. This is partly due to correspondingly larger covers presenting a corresponding additional weight burden and partly because of a lack of availability of a reasonably robust and lightweight cover for use in such applications.

In terms of providing a complete disclosure of all potentially relevant background prior art, UK patent number GB 2513759 B is to be noted as it pertains to another invention by the present inventor 'David Gooding' entitled 'Improved safety shield for a pipe joint'. As its name suggests this pertains to a shield for a pipe joint that comprises a layered structure that is specifically configured for use in shielding such joints.

Those skilled in the art will appreciate that the amount of cable and hose required in many mines is typically vast and thus there is a need to improve efficiency and thus overheads by minimizing damage to cables and hoses. Reducing or eliminating such damage negates the amount of down time for operation of machinery that is located in the mine and provides a much safer working environment for personnel/ operatives and whoever else may have cause to be present underground.

The safety aspect associated with overhead cables/hoses in various industrial environments, such as in mines, factories and other installations such as power stations, is of paramount importance in order to reduce/prevent loss of life and/or injuries as much as possible. Evidently damaged electrical power and communications cables present a serious electrical hazard, but also it is frequently the case that hoses carry fluids at very high pressures. With the fatter a burst hose can cause severe problems in various ways such as, for example, in the release of hot liquids and/or gases that may burn a person. Furthermore, such liquid/gas may be under very high pressures and thus the release thereof may be explosive or of a type that is released as a very fine jet of fluid that may readily and severely pierce the clothing and or skin/body of a person. The latter effect is known to those skilled in the art as a hydraulic injection. Although the aforementioned known cover comprising a steel mesh/aramid outer layer on a nylon inner layer helps to alleviate certain problems to do with impact, it (1) lacks approved testing to certain predefined conditions, in particular high pressure, and it is associated with additional problems such as (2) cable/hose degradation over time due to water derived from the roof of a mine and (3) insufficient provision of protection to operatives/persons in a mine from hose bursts that are associated with very high pressures and from malfunctioning equipment such as chocks being activated because of damaged electrical cables.

Inter-chock conduits thus typically comprise hydraulic hoses and one or more cables such as power and/or communications cables. As described above, these are typically subjected to debris falling from the roof in between the roof supports as they move. This can cause damage to the outer rubber covers of the hose and cables as follows:

(a) hydraulic hoses

As will be understood by those skilled in the art, a hose of the type commonly used in an underground mine typically comprises a reinforced structure that comprises a matrix (in the form of braiding) of reinforcing metal bearing fibres. Commonly such braiding is made of carbon steel. Such a structure may itself be formed within a polymeric material such as of a plastics or rubber based material and constitute the entire wall of a hose or this may be used as an outer layer with, for example, a liner of a non-metal bearing layer of plastics or rubber based polymeric material. Thus, with such a structure of a hose as is normally suspended overhead directly from the roof or a chock canopy:

Where such damage exposes the outer braid steel wires it allows mine water, which is highly corrosive, to penetrate causing corrosion of the steel wires. The hose relies on the strength of the steel wires to contain the high pressure hydraulic fluid. This deletion in strength causes the hose to fail and fluid at high pressure to escape.

In addition, if debris from above falls onto such a hose, large and heavy pieces or rock and the like may strike the hose and such impacts may cause end terminal failure (failure of the mechanical end pieces of a hose as link from one hose to the next) because the hose assembly is not designed to withstand such severe end terminal mechanical pull forces.

First possible consequence of (1) or (2): loss of production in a mine as is caused by the time taken to locate the failure and to remove and replace or otherwise repair the failed hose.

Second possible consequence of (1) or (2): injury to personnel and/or fatalities by fluid injection wherein a person, such as an operative/engineer at a coal face, is close to the point of failure when a failure is arising or has arisen.

(b) Cables

Inter-chock cables are also subject to being hit by falling roof debris in a mine:

When the debris is large and heavy enough the weight striking the cable pulls on the end termination points of the cables as connect from one cable to the next causing end termination failure.

The main consequence is the loss of production caused by having to change and fit a new cable.

In view of the above identified problems those skilled in the art will appreciate that there is thus a need to provide an improved protective cover in the form of a sleeve and/or otherwise an improved system for use in protecting (a) overhead conduits from damage and, simultaneously, (b) operatives from serious injury through hose bursts and/or malfunctions caused by degraded electrical cables.

SUMMARY OF THE INVENTION

An object of the present invention is to provide a protective cover for at least one conduit such as a cable and/or hose in order to prevent or reduce damage thereto.

Another object of the present invention is to provide a protective cover configurable as a sleeve for use in protecting a conduit assembly comprised of one or more cables and/or hoses in order to provide protection from external matter, such as, for example debris and/or water falling from the roof of a tunnel in an underground mine.

Another object of the present invention is to provide a protective cover in the form of a sleeve that is structurally robust and specifically configured for use in protecting overhead conduits in a mine.

Another object of the present invention is to provide an improved protection system for covering a conduit assembly wherein the conduit assembly is suspended above a surface as opposed to resting on a surface as such.

According to a first aspect of the present invention there is provided a protective cover for surrounding a conduit assembly in a mine, said protective cover having a flexible elongate main body that comprises a plurality of discrete functional layers and which is configurable as =a sleeve having an outer surface, said protective cover characterised by comprising:

a first layer, substantially comprised of an aramid based material, that is structurally configured to provide substantial protection from the force associated with impacting projectiles originating from the external environment whilst also being configured to substantially resist internally generated forces of the type that are typically associated with a burst hose; and a second layer, adjacent to the outer surface of said first layer, that is structurally configured in the form of a mesh thereby protecting said first layer from external bodies that may otherwise potentially induce tear damage to said first layer; and said protective cover characterised by further comprising:

a third layer, adjacent to said first layer, comprising a polymeric membrane that is substantially impermeable to the passage of at least one liquid.

Preferably said aramid based material comprises a fabric of woven ballistic grade para-aramid fibre.

Preferably said aramid based material comprises comprises Poly(p-phenylenterephthalamid) (PPTA).

Preferably said aramid based material comprises a blend of yarns from the set comprising: meta-aramids and para-aramids.

Preferably said aramid based material comprises a blend of yarns that form a cloth having a weight over 500 grams per metre squared and which is rated to withstand at least 300 degrees Celsius continuous heat and at least 1000 degrees Celsius intermittent radiant heat Preferably said third layer is substantially impermeable to water from the external environment.

Preferably said protective cover is configured to protect a hose comprising one or more internal liquids from the set comprising water, acids, oils, bases, or compositions thereof and said third layer is substantially impermeable to at least one liquid from said set.

Preferably said third layer is additionally specifically configured to substantially resist internally generated forces of the type that are typically associated with =a burst hose.

Preferably said third layer comprises a fibre-based cloth, such as a glass cloth, that comprises said polymeric coating.

Preferably said polymeric layer comprises a coating of silicone rubber or PTFE.

Preferably said mesh structure of said second layer is woven and configured from at least two layers of mesh material.

Preferably said mesh structure provides flexible armour in the form of a mail that is made of metal or a metal alloy such as stainless steel.

Preferably said second layer comprises a plurality of adjacent layers of mesh.

Preferably said mesh has a gauge of approximately two strands per centimetre.

In a preferred embodiment of the present invention said sleeve additionally suitably comprises a fourth layer in the form of an innermost liner layer of a synthetic polymer, such as a polyamide, that is thereby adjacent to said third layer that comprises said membrane.

Preferably said cover is substantially permanently affixed to a conduit assembly.

Preferably said cover comprises a fastening assembly specifically configured to enable said cover to be detachably removed from said conduit assembly.

Preferably said fastening assembly is such that said third layer of said sleeve that comprises said membrane is formed as an elongated sheet having opposed longitudinal edges, said opposing longitudinal edges including means for releasably attaching said opposed longitudinal edges together along the length of said conduit assembly.

Preferably said means for releasably attaching said opposed longitudinal edges together comprises a hook and loop fixing arrangement.

Preferably said first layer is also comprised of an elongate sheet which comprises a longitudinal region that is configured to engage with an opposed longitudinal region on the outer surface of said second layer, such that said opposing regions comprise means for releasably attaching said opposed longitudinal regions together along the length of said conduit assembly.

Preferably said longitudinal region of said first layer comprises an edge of said first layer.

Preferably said means for releasably attaching said opposed longitudinal regions together comprises a hook and loop fixing arrangement.

Preferably said cover comprises at least one strap that is configured to extend around the circumference of said cover when configured in the form of a sleeve.

Preferably said strap comprises or is otherwise associated with a ratchet tightening mechanism.

Preferably said cover comprises one or a plurality of points of attachment for attaching said cover when configured as a sleeve to a flexible strand, such as a wire located above the sleeve in a mine, in order to thereby suspend said sleeve therefrom.

Preferably a said attachment point comprises a hanging means in the form of an eyelet or a hook.

Advantageously as compared with known covers for overhead cables and/or hoses a cover as configured in accordance with present invention assists in reducing the weight of a protective cover acting on a given conduit assembly that is protected within.

According to a second aspect of the present invention there is provided a conduit protection system comprising a protective cover of the type claimed in any of claims 1 to 26 appended hereto and at least, one conduit from the set comprising: a hydraulic hose, an electric power cable and a communications cable.

According to a third aspect of the present invention there is provided a system for protecting at least one or a plurality of cables and/or hoses from matter falling from above, said system comprising use of at least one protective cover of the type claimed in any of claims 1 to 26 as are appended hereto such that said cover is suspended from a flexible strand that is in turn attached to a fixed structure that is located substantially vertically above said at least one or plurality of cables and/or hoses.

Preferably said flexible strand is suspended from two points of said fixed structure.

Preferably said fixed structure comprises at least one roof joist of said mine or a chock canopy.

Preferably said flexible strand comprises the shape of a catenary.

Preferably said flexible strand comprises a metal wire.

Preferably said flexible strand comprises a wire made of stainless steel.

Advantageously as compared with known systems for protecting overhead cables and/or hoses the protective system as configured in accordance with present invention utilises a protective cover and a suspension assembly to hang a cover in order to reduce the weight of the cover acting on a given conduit assembly that is protected within.

BRIEF DESCRIPTION OF THE DRAWINGS

For a better understanding of the invention, in view of the prior art overhead cable system as illustrated in FIG. 1, and to show how the same may be carried into effect, there will now be described by way of example only, specific embodiments, methods and processes according to the present invention with reference to the accompanying drawings in which.

DETAILED DESCRIPTION OF THE EMBODIMENTS

There will now be described by way of example a specific mode contemplated by the inventors. In the following description numerous specific details are set forth in order to provide a thorough understanding. It will be apparent however, to one skilled in the art, that the present invention may be practiced without limitation to these specific details. In other instances, well known methods and structures have not been described in detail so as not to unnecessarily obscure the description.

Best Mode for Protective Covers as Configured in Accordance with the Present Invention—Four Layered Structure as per FIGS. 2 to 9.

Figure 2:
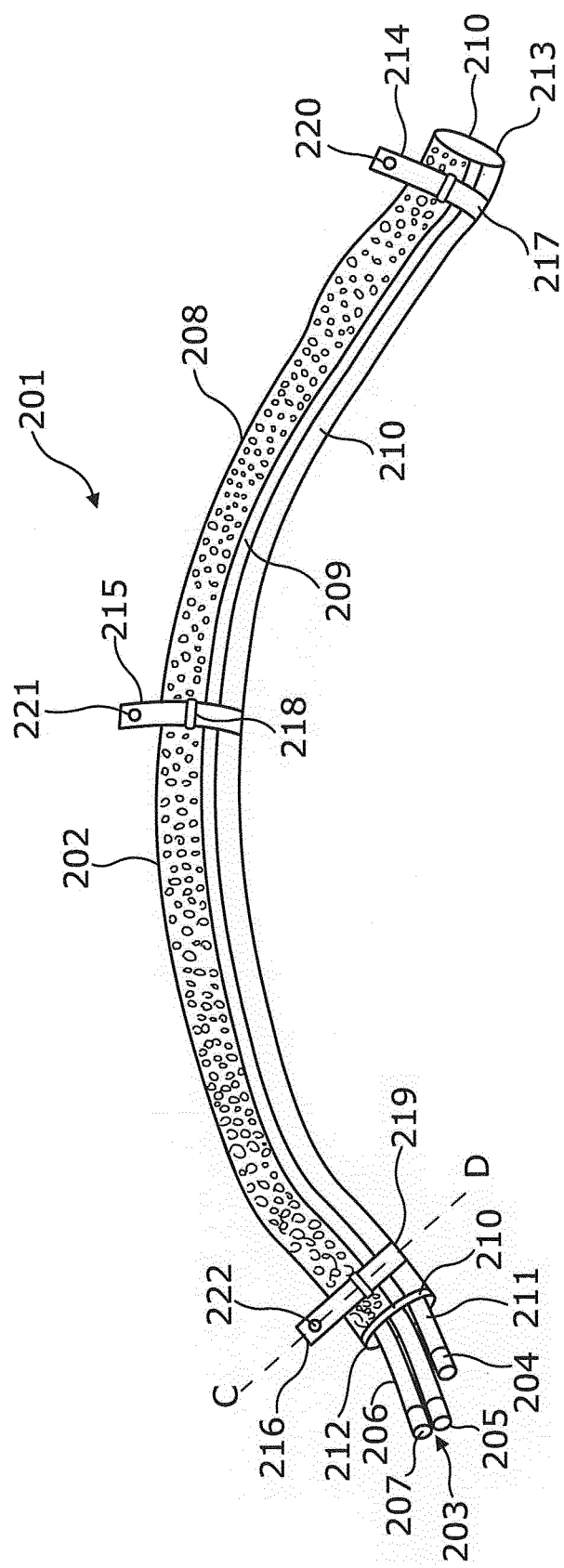
FIG. 2 schematically illustrates, in perspective view, the best mode contemplated of a protected conduit system comprising a protective cover in the form of a sleeve as is configured in accordance with the present invention.

In accordance with the best mode contemplated of the present invention, FIG. 2 schematically illustrates, in perspective view, a protected conduit system 201 comprising a guard in the form of protective cover 202 as substantially constitutes an elongate tubular sleeve. Sleeve 202 protects a conduit assembly 203 as is substantially located inside the sleeve. In the example depicted the encased conduit assembly 203 comprises four adjacent elongate tubular conduits that are substantially parallel to each other along their length, and which consist of respective hoses 204, 205 and respective electric cables 206 and 207. Those skilled in the art will appreciate however that the exact composition of a given conduit assembly depends on the particular application (or applications) for which it is required and may thus comprise more than four or less than four conduits that may, for example, comprise one or more of each of the following: hydraulic hoses, electric power cables and communication cables.

Sleeve 202 is substantially configured as a series of discrete layers which, in the best mode contemplated, are specially selected such that each is substantially formed of a different material to the others. Working in the direction from the outside to the inside of sleeve 202 the $1^{st}$, $2^{nd}$, $3^{rd}$ and $4^{th}$ material layers comprise:

a. outer impact protection layer 208 as forms at least a part of the outermost surface of the sleeve
b. inner impact protection layer 209 as is adjacent to layer 208
c. liquid impermeable membrane layer 210 as is adjacent to inner impact protection layer 209 and which is required to be substantially impermeable to at least one liquid such as, in mining applications, water
d. sleeve liner layer 211 as prevents membrane layer 210 from directly contacting the conduit assembly Respective layers 209, 210 and 211 are, in the best mode contemplated, configured such that when in sleeve form the protective cover completely surrounds conduit assembly 203. Notably, outer impact layer 208 is mainly concerned with protection from falling debris and thus this may be formed such that it does not totally encircle conduit assembly 203 and instead forms only a layer over the top of the cover. Those skilled in the art will appreciate that the specified layering as may be present for a given application of a protective cover as configured in accordance with the present invention is such, that one or more of any of layers 208, 209, 210 and 211 may not be not required to totally encircle a given conduit assembly.

Protective cover 202, in the form of a sleeve, substantially comprises an elongate cylindrical member which thus comprises respective first and second open ends 212 and 213. In the example shown the respective ends of the sleeve comprise a folded edge or hem of one or more of the layers 209, 210 and 21, preferably the liquid impermeable membrane 210 and/or liner 211, in order to prevent the outer layer 208 from coming into contact with any of the conduits of conduit assembly 203. This is required because the outer layer 208 substantially comprises of, in the best mode contemplated, a knitted stainless steel wire mesh that may thus damage a conduit if the open end of the sleeve was otherwise to terminate in a manner, such as a hem, that consisted of layer 208.

As will be understood by those skilled in the art, protective sleeve 202 of conduit protection system 201 may be configured in various ways and there are preferred general configurations of such guards. The first preferred general mode of configuration, referred to hereinafter as type 'A', an example of which is illustrated in FIG. 2, comprises a wrap such that the cover is formed as an elongated sheet having opposed longitudinal edges and wherein the opposing edges of at least one layer include means for releasably and securely attaching the opposed longitudinal edges of the at least one layer together around the length of a given conduit assembly. In this way the entire cover may be readily placed around (i.e. wrapped around) a conduit assembly and similarly may be readily 'opened' and thus removed by unwrapping. Thus a wrap type of configuration enables the protective cover to be applied (i.e. retro fitted) or removed in situ such as to or from a conduit assembly of the type that is hung from the roof of an underground mine. This means of securing the cover about a given conduit assembly provides a continuous fixing along the entire length sleeve and in the best mode contemplated it constitutes the primary such securing means.

The second preferred general mode of configuration of a protective cover as configured in accordance with the present invention is referred to herein as type 'B'. Type B configuration substantially comprises a tubular sleeve that has open ends, but which in contrast to the first general type of configuration, does not comprise a means of opening along its axial length and thus may not be easily/readily fitted over an already installed conduit assembly without having first to disconnect or disassemble the conduit assembly from its installed condition. Those skilled in the art will readily appreciate that type B mode of configuration is evidently simpler to make than is a cover as made in accordance with type A configuration in view of the fact that an opening/closure means along its length is not provided. Type B is thus considerably cheaper and quicker to manufacture and is primarily intended as the mode to be adopted in applications wherein conduit assemblies having a protective cover are required to be manufactured in a factory away from a given site of application, such as a coal mine, wherein such a conduit assembly is to be deployed for use.

A protective cover as configured in accordance with either the first (type A) or second (type B) general mode of configuration may be further configured such that it comprises additional securing means along its axial length in the form of one or more securing straps. Those skilled in the art will understand that this is particularly important for embodiments that utilize the first general mode of configuration in order to thereby provide additional securement of the longitudinal opening means as is present along the length of the sleeve.

In accordance with the present invention, a protective sleeve as configured in accordance with either type A or type B configuration, particular embodiments of which may or may not comprise the aforementioned additional securing means, may be configured as preferred embodiments that either do or do not additionally comprise a means of suspending, that is hanging, the sleeve from an overhead structure. In accordance with an important further aspect of the present invention there is provided an improved system for suspending a conduit assembly that comprises various components, notably (a) the provision of an overhead wire which is itself configured to be suspended from a an overhead structure such as the roof of a mine and (b) the provision of a series of attachment means on a given sleeve that are specifically configured to enable the sleeve to be suspended from a series of points along such an overhead wire. In this way, rather than merely suspending a conduit assembly that comprises a protective sleeve from, for example, the roof of a mine (as is generally shown in the example prior art system of FIG. 1), the present invention provides for an overhead wire from which such a covered (or for that matter an uncovered) conduit assembly may be suspended at various points in order to spread the weight thereof across a greater number of points of attachment to the immediate supporting structure (i.e. the overhead wire).

Figure 1:
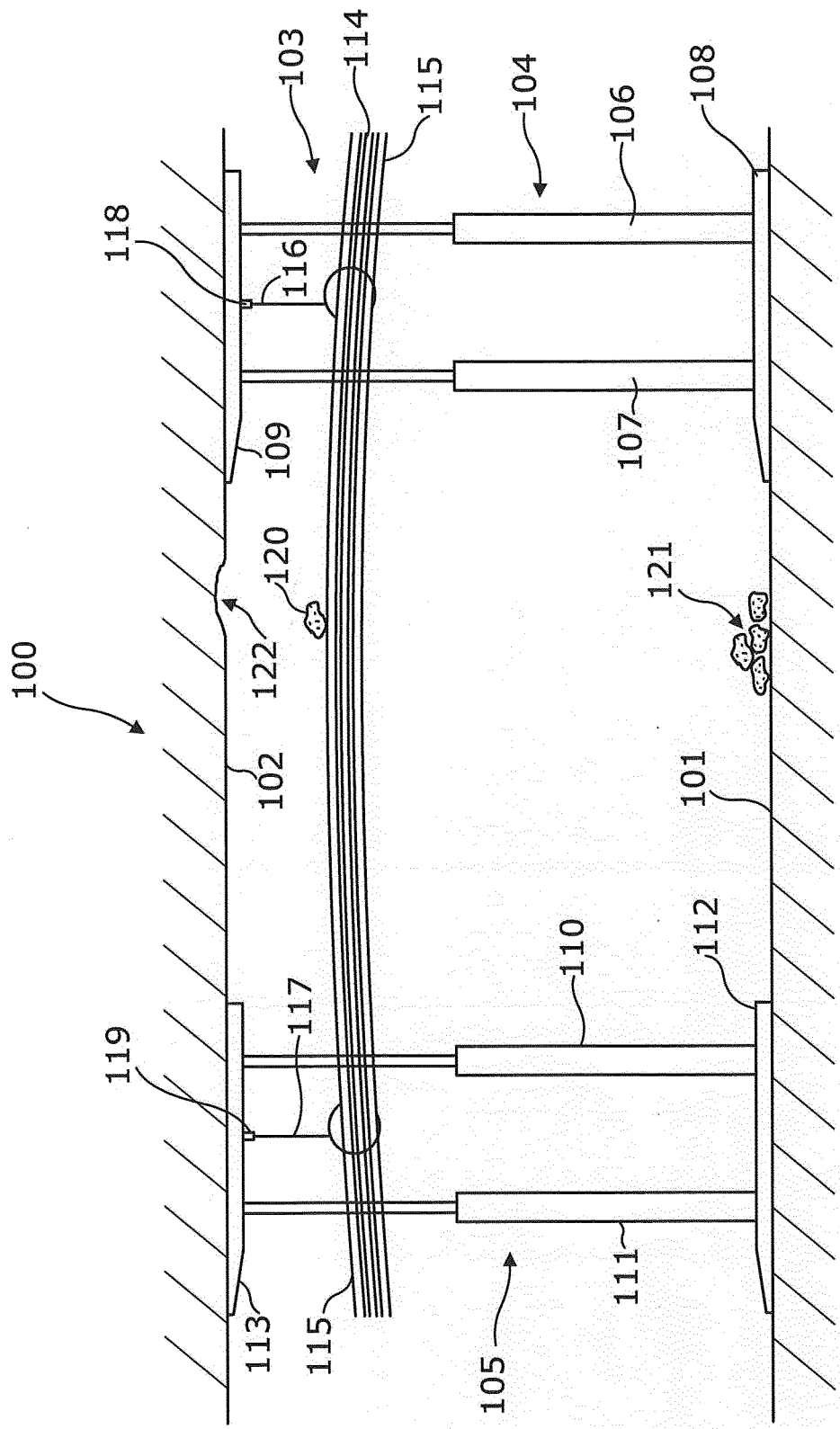

Such a system of spreading the load is advantageous over the prior art system of FIG. 1 because it readily permits for a greater number of attachment points as compared with the system of FIG. 1 which typically concerns each respective attachment point in a mine corresponding to a respective next chock canopy along a mine. Moreover, somewhat surprisingly, the inventors of the present invention have ascertained that such an overhead wire, if hung in a non-taught manner to thereby form a curve between two points, thereby constituting a catenary, takes some of the impacting force of falling debris away from that which would otherwise be experienced by the cover per se. This has been found to arise, in part at least, from such an impacting force causing such a catenary wire to impart kinetic energy to the wire which thus swings in whatever direction the resultant forces acting take it.

In the example of FIG. 2, protective sleeve 202 comprises the aforementioned additional securing means along its axial length in the form of one or more securing straps. Thus securing straps 214, 215 and 216 are provided on sleeve 202 all of which wrap around the circumference of the outer surface of the sleeve. Straps 214, 215 and 216 thus wrap around sleeve 202 and over the primary fixing means that extend substantially parallel to the openings along the length of cover 202. Strap 214 is provided relatively near to sleeve end 213 and strap 216 is provided relatively near to the opposite end 212 of the sleeve. Additional strap 215 is positioned approximately mid-way along the axial length of the sleeve. All three straps are configured with a means of fastening themselves tightly and securely, around the sleeve.

In the best mode they each comprise a hook and loop fixing arrangement (such as Velcro®) and they also each comprise a basic cinch buckle, respectively buckles 217, 218, 219, to assist in pulling the strap as much as desired before affecting the hook and loop fixing as well as providing a means to keep the distal end of the strap in place about the sleeve.

In the best mode example of FIG. 2, protective sleeve 202 also comprises a preferred embodiment of the aforementioned series of attachment means that are specifically configured to enable the sleeve to be suspended from a series of points along an overhead catenary type wire. Thus respective securement straps 214, 215 and 216 are configured such that they also incorporate an attachment point in the form of respective orifices (eyelets) 220, 221 and 222. The eyelets are preferably in the form of a metal ring that is suitably of a non-rusting material such as brass. In this way, in accordance with the present invention, the eyelets are able to receive and thus attach to an overhead catenary wire as described above.

Figure 3:
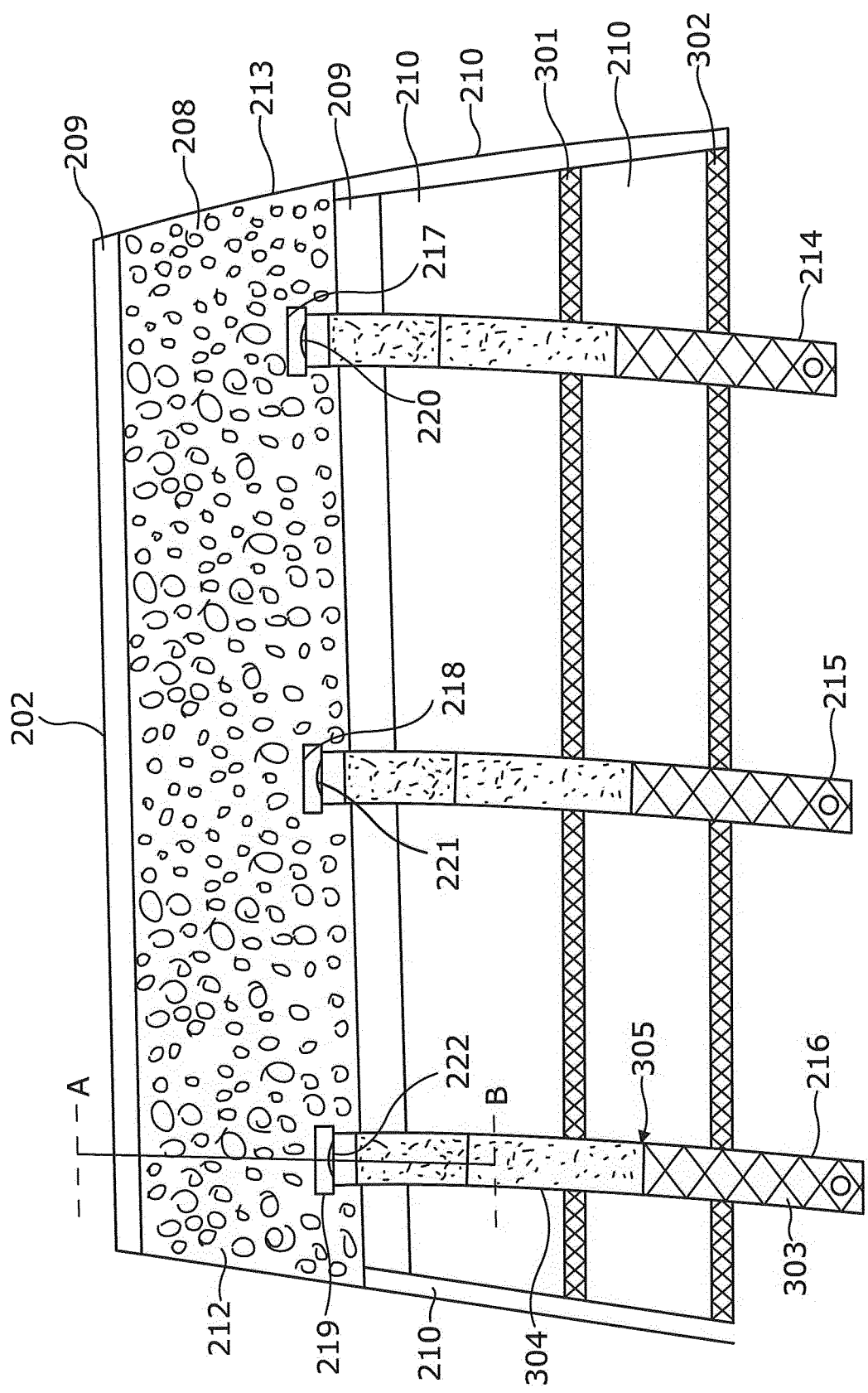
FIG. 3 schematically illustrates, in perspective view, the protective cover of FIG. 2 as opened out from the form of a sleeve into a planar rectangular shape such that the view shown is, with the conduits removed, of the outside surface of the sleeve.

FIG. 3 schematically illustrates, in perspective view, the protective cover of FIG. 2 as opened out from the form of a sleeve into a planar rectangular shape such that the view shown is, with the conduits removed, of the outside surface of the sleeve. In this way FIG. 3 thus further details a cover as configured in accordance with the first general mode of configuration (type A) and thereby provides greater detail as to the connection of one layer to the next. In accordance with the best mode, outer impact protection layer 208 occupies roughly one third to one half of the total external surface area of the cover and thus, in the example shown, is not configured to pass all the way around a given conduit assembly, but rather, when in situ in a mine for example, is only present on top in order to protect against any debris such as rock falling from above. Layer 208 sits on top of and is thus adjacent to inner impact protection layer 209 In the best mode, inner impact protection layer 209 extends about the conduit assembly to the extent that is required to provide the required protection and safety for a given application. In the example shown this layer extends around half of the overall circumference of the covered although in some application sit may be appropriate to configure this layer such that it completely surrounds a given conduit assembly 203. Outer impact layer 208 is fixed to inner impact layer 209 by any suitable means such as by being stitched thereto using an aramid/steel thread. Because layer 208 is above/external to layer 209 and, in the best mode, comprises a steel mesh then in addition to the portions of layer 209 as extend below and beyond the edges of outer impact layer 208, it will be appreciated that inner impact layer 209 can effectively be seen from above through the outer mesh layer. Inner impact layer 209 is in turn affixed along its longitudinal length to liquid impermeable membrane layer 210, the latter being covered by inner impact layer 209 on the exterior side and by liner layer 211 on the other side. As FIG. 3 is a view of the external surface then sleeve liner layer 211 is not as such visible as it is located on the opposite surface to that shown i.e. it is located on the surface that forms the inside of the sleeve when the cover is wrapped around a given conduit assembly.

FIG. 3 further illustrates first and second primary fixing means in the form of respective longitudinally extending fixing strips 301 and 302 as extend along the length of the cover 202 and which are thus substantially parallel to the longitudinal axis of the cover. In the best mode these are provided, as shown in FIG. 3, on layer 210 with fixing strip 302 extending along the outer edge of sheet layer 210 and fixing strip 301 being positioned on the same surface of layer 210 as outer edge strip 302, but away from the edge along a line that is thus closer to the centre of sheet 210. In this way fixing strip 301 may thus be referred to as 'inner' relative to outer edge strip 302. However, for certain other embodiments as may be preferred for particular applications fixing strips 301, 302 may be placed directly on the relevant presenting surface as is present at a given point around the cover. Fixing strips 301 and 302 each respectively represent, in the best mode, one part of a two part hook and loop fixing arrangement that are thus configured to attach to the other respective part in each respective set. In the example the cross hatching represents 'hook' type fixing material and thus strips 301 and 302 are configured to affix to a corresponding strip of 'loop' type fixing material as are located elsewhere on the cover. Those skilled in the art will appreciate that loop type fixing material may be used for strips 301, 302, but in that case the fixing material that is located elsewhere would evidently then be required to comprise hook type material.

In addition to the primary fixing means as comprises fixing strips, 301 and 302, FIG. 3 also further details the secondary fixing means as per the respective straps 214, 215 and 216 as comprise a suitable fixing arrangement. In the best mode each given strap comprises of a strong and flexible material such as nylon webbing (or another suitable polyamide) upon which a hook and loop type of fixing means is affixed thereto. In this regard, by way of example, strap 216 is divided into two main regions on its external surface that is shown in FIG. 3: region 303 comprising hook type fixing material and region 304 comprising loop type material, these regions each extending along the length of the strap until they meet at dividing/stitch line 305 as is located about a third along from the outer end of the strap. In this way, when cover 202 is wrapped around a conduit assembly 203, strap 216 thus wraps around such that the hook material of region 303 is, having been passed through cinch buckle 219, thereby positioned to engage with and thus affix to the loop material of region 305.

Figure 4:
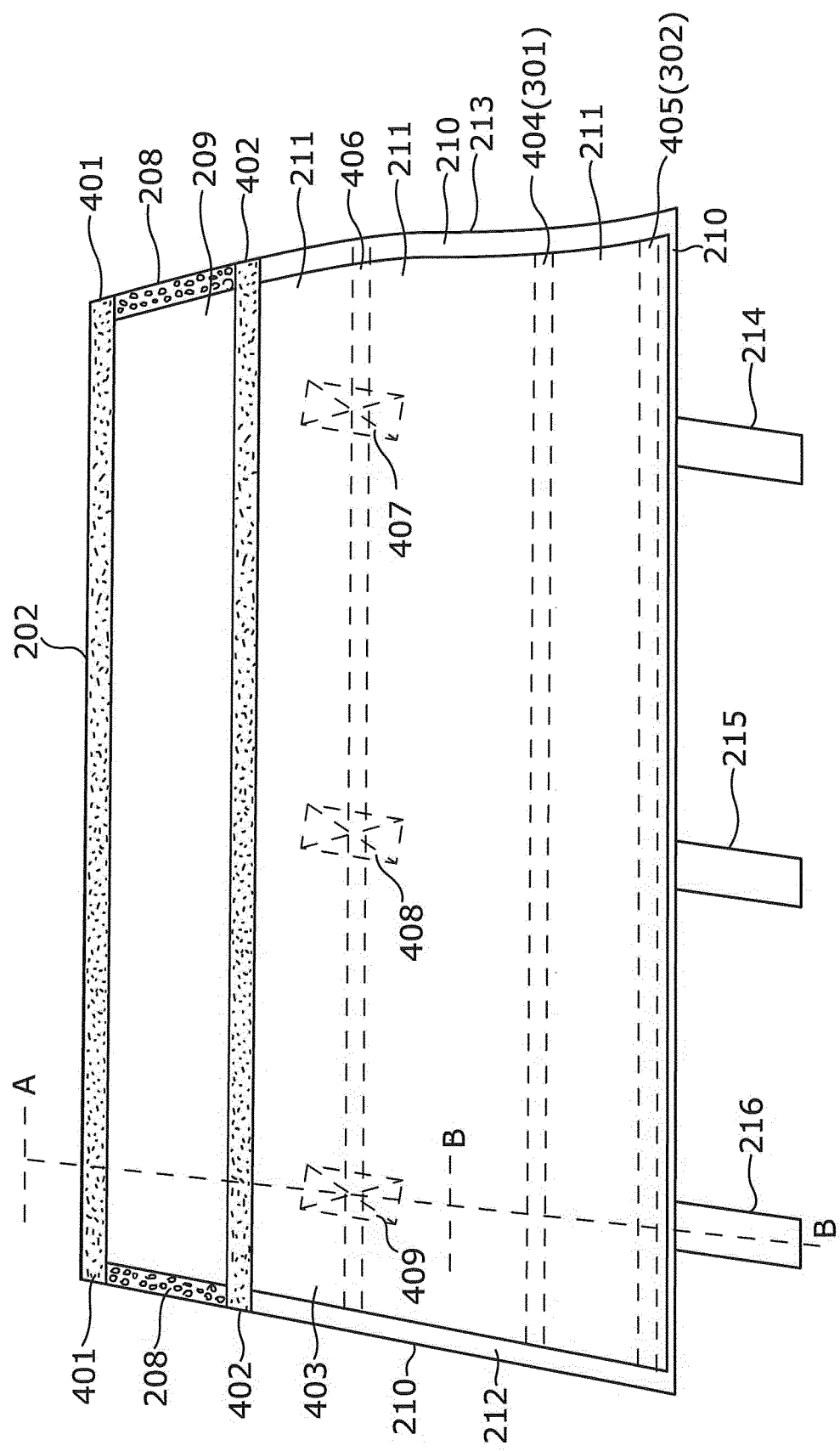
FIG. 4 schematically illustrates, in perspective view, the protective cover of FIGS. 2 and 3 in its opened out form such that the view shown is, with the conduits removed, of the inside surface of the sleeve.

FIG. 4 schematically illustrates, in perspective view, the protective cover 202 of FIGS. 2 and 3 in its opened out form such that the view shown is, with the conduits removed, of the inside surface of the sleeve. Outer impact layer 208 is shown in this view as merely present along the underside edges of cover ends 212, 213 in view of this layer substantially being positioned above the external surface of inner impact layer 209 as has been described above in relation to FIG. 3. FIG. 4 specifically details the above-referenced second part of each of the two part hook and loop fixing arrangements as respectively comprise fixing strips 301 and 302. Thus the underside of inner impact layer 209 (shown as the top side in the figure) comprises fixing strip 401 along the upper longitudinal edge of sheet 202 and the underside of membrane/liner 210/211 comprises fixing strip 402 as extends along the uppermost edge thereof and which is thus positioned more in a direction towards the centre of sheet 202 than is strip 401. Thus, for the case where respective strips 301 and 302 comprise hook material, fixing strips 401, 402 will thus be required to comprise loop material. Outermost strip 401 runs along the outer longitudinal edge of inner impact layer 209 whereas the inner longitudinally extending strip 402 is affixed to the longitudinal edge of a flap 403 (as is, for example, further illustrated in relation to FIGS. 5 and 6 below) that, in the example illustrated, is substantially comprised of liquid impermeable membrane 210 and sleeve liner 211 and thus without any component of layer 209. The corresponding positions of fixing strips 301 and 302 of FIG. 3 as are apparent on the external surface of cover 202 are represented in FIG. 4 by virtue of respective pairs of broken lines 404 and 405 which may constitute stitch lines for embodiments, as in the present example, where respective fixing strips 301, 302 have been affixed by stitching through respective layers 209, 210 and 211. In operation, outermost fixing strip 401 is configured to affix to inner strip 301 which is depicted in FIG. 4 as parallel stitch lines 404 and inner strip 402 is configured to affix to outer strip 302 as is depicted in FIG. 4 as parallel stitch lines 405. Thus, the reason far the presence of the labelling in FIG. 4 of '404 (301)' and '405 (302)' is to highlight the correspondence between fixing strips 301, 302 as appear on the external facing surface of protective cover 202 as depicted in FIG. 3 with respect to the fixing strips 401, 402 as are shown in FIG. 4 and thus as are present on the opposite (internal) surface of protective cover 202.

As indicated earlier in the embodiment illustrated in FIGS. 2, 3 and 4 the inner impact resistant layer 209 comprises approximately half of the circumference of the cover. This is shown by virtue of double stitch line 406 in FIG. 4 as fixes inner impact layer 209 to membrane 210 and also to, as is seen in the figure, to liner layer 211. In a similar manner rectangular stitch lines, as are associated with the fixing of respective straps 214, 215 and 216 to the layered cover 202, are also present on the surface of liner 211 that is shown in FIG. 4. These respective rectangular stitch lines are generally indicated for respective straps 214 to 216 at 407, 408 and 409.

Figure 5:
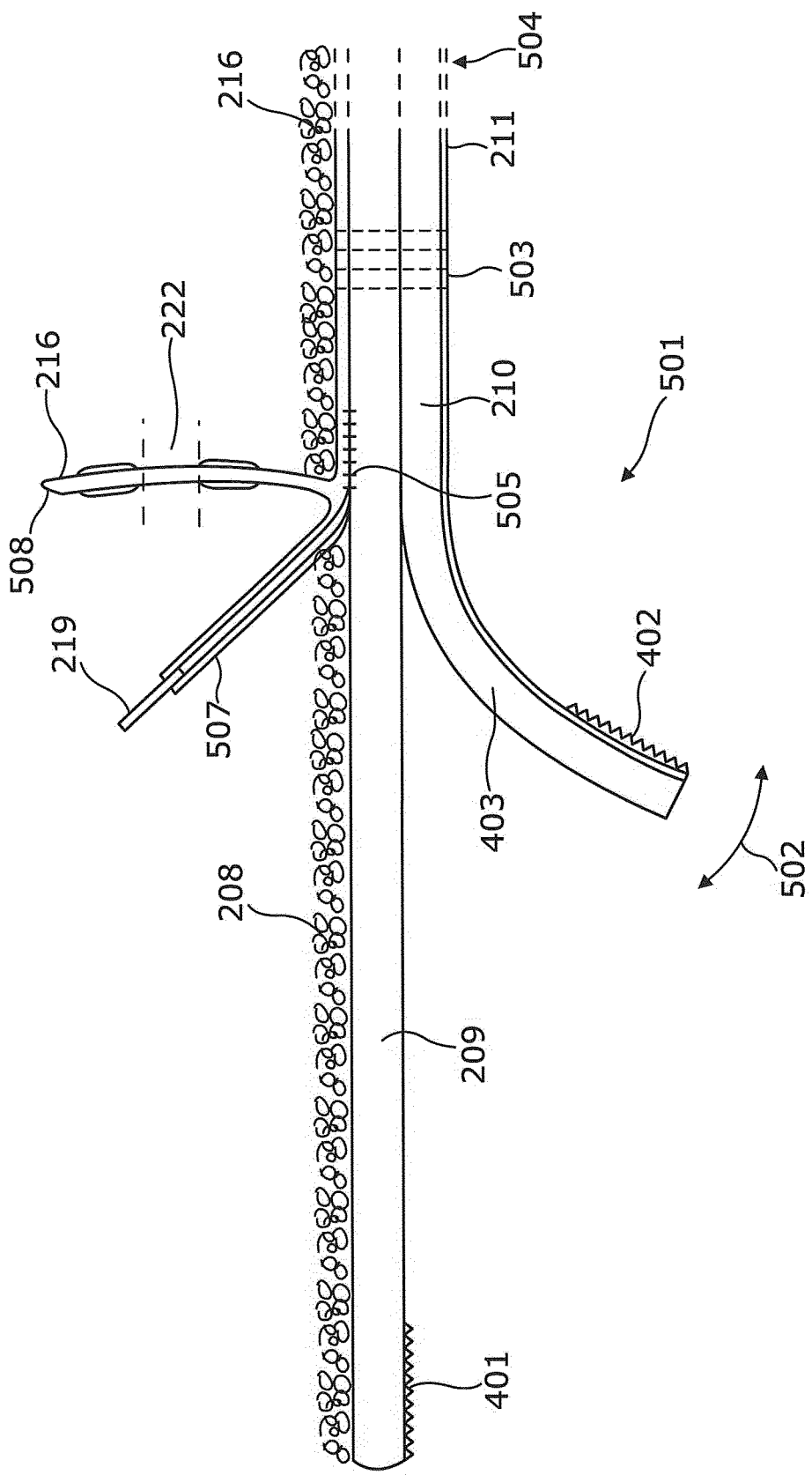
FIG. 5 schematically illustrates, a cross sectional view along the line A-B as is shown in FIGS. 3 and 4 and which follows the longitudinal axis of strap 216.

In order to better illustrate the nature and extent of the respective layers 208, 209, 210 and 211 of protective cover 202 relative to one another, FIG. 5 schematically illustrates, a cross sectional view along the line A-B as is shown in FIGS. 3 and 4 and which follows the longitudinal axis of strap 216. Line A-B is thus substantially perpendicular to the longitudinal axis of sleeve cover 202 and is taken along the direction of the longitudinal axis of the secondary securement strap 216. For purposes of illustrating the nature of flap 403 it is generally depicted at 501 as raised away from and thus transverse to the remainder of the main body of cover 202. Nevertheless it may be moved and thus may, for example, be brought into parallel alignment with layer 209 or made to swingout perpendicular to layer 209. As indicated by double headed arrow 502 towards the outer edge of flap 403, the flap may be moved towards or away from the main body as it is rotated about the connection point 503 of membrane/liner 510/511 to inner impact layer 209. Connection point 503 may, for example, comprise stitching of layers 210 and 211 to layer 209 and, in the best mode as shown, also to layer 208. In this way flap 403 is able to function in a hinge-like manner. The result is that flap 403 is thus formed of an end of membrane/liner 210/211 which itself terminates with fixing strip 402. At the opposite end of the membrane/liner to flap 403, that is in a direction to the right as indicated by arrow 504 there is provided (not shown) the fixing region comprising respective fixing strips 301 and 302 on the external surface of sleeve 202, strip 302 being, as shown in FIG. 3, at the terminal point of membrane/liner 210/211 and strip 301 being before that and thus in a position that is nearer to flap 403 than is strip 302.

In operation, cover 202 may be urged into its sleeve like form by effectively gripping region 504 as comprises fixing strips 301 and 302 and moving it in the direction so as to thereby enable respective fixing strips 301, 302 to engage with and affix to respective fixing strips 401, 402. In other words the position of and length of flap 403 and the positioning of the respective fixing strips as are present on the body of the cover are such that outer fixing strip 401 engages with inner fixing strip 301 and inner fixing strip 402 engages with outer fixing strip 302.

There are various possibilities as regards the exact configuration of how the fixing strips are arranged with respect to the inner impact layer and the liquid impermeable membrane layer. As will be understood by those skilled in the art, the above-referenced incorporation of a flap is found to facilitate the provision of a double closure system, one closure provided for the liquid impermeable membrane layer 210 and the other for the inner impact resistant layer 209.

As will be understood by those skilled in the art, the inner wrap layer comprising liquid impermeable membrane 209 is, as described in relation to FIGS. 2 to 5, such that its inner and outer surfaces each comprise a cooperating fixing strip, respectively 402 and 302, in order to affect closure of the membrane about a conduit assembly. However, it is to be understood by those skilled in the art that different embodiments to that described in FIGS. 2 to 5, fixing strip 302 as shown connected to inner impact layer 209 may potentially be connected to a suitably longer inner impact layer 209 rather than to membrane/liner assembly 210/211.

In terms of the exact fixing arrangements of layer upon layer and of the primary fixing strips and the secondary securement straps various possibilities exist ranging from stitching through all layers to stitching only to the inner impact layer 209. In some applications the integrity of the membrane layer 210 will be important as regards prevention of liquid, notably water, entering the sleeve from the outside environment whereas in other applications punctures through stitching will not represent a serious problem. Thus in applications where control of high pressure bursts is the primary concern then stitching of the membrane, inner impact and liner layers together at frequent points will be preferable in order to maintain the integrity of the layering as will also be the case for the securement of the straps 214, 215 and 216 and fixing strips 301, 302, 401 and 402.

In addition to the longitudinal fixing arrangement as comprises respective fixing strip pairs 301, 401 and 302, 402, FIG. 5 also better illustrates the nature of secondary fixing strap 216 and its connection at 505 to the external surface of the main body of protective cover 202. In the best mode contemplated, strap 216 is fixed by stitches on top of layer 209 (and/or layer 208). Inner impact layer 209 may be suitably fixed to membrane layer 210 by stitching such as is generally indicated at 503 along a length of layer 209 as extends in a direction towards region 504. Fixing strap 216 can be seen to comprise two protruding end parts 507 and 508 that respectively comprise buckle 219 (as is used to pass there-through the distal end of strap 216 in order to tighten and fix strap 216 in place) and 508 as comprises a hanging means 222 as is used to suspend the cover from an overhead support. In the best mode a hanging facility 222 takes the form of an eyelet as described, but may also take the form of a hook (effectively an open ring in terms of function) that thereby enables ready engagement to and from a given supporting overhead wire. Nevertheless it is also to be understood that the best mode illustrated in FIGS. 2 to 5 is such that one or more hanging means and/or one or more tightening straps are not necessarily essential for certain applications. Thus for the avoidance of doubt the present invention as regards any aspect concerning the layers of a cover is not to be considered as simultaneously limited to any such hanging features and/or securement straps. In other words embodiments as regards the sequence of the respective layers claimed are envisaged which do not comprise any such hanging features or secondary securement straps.

Figure 6:
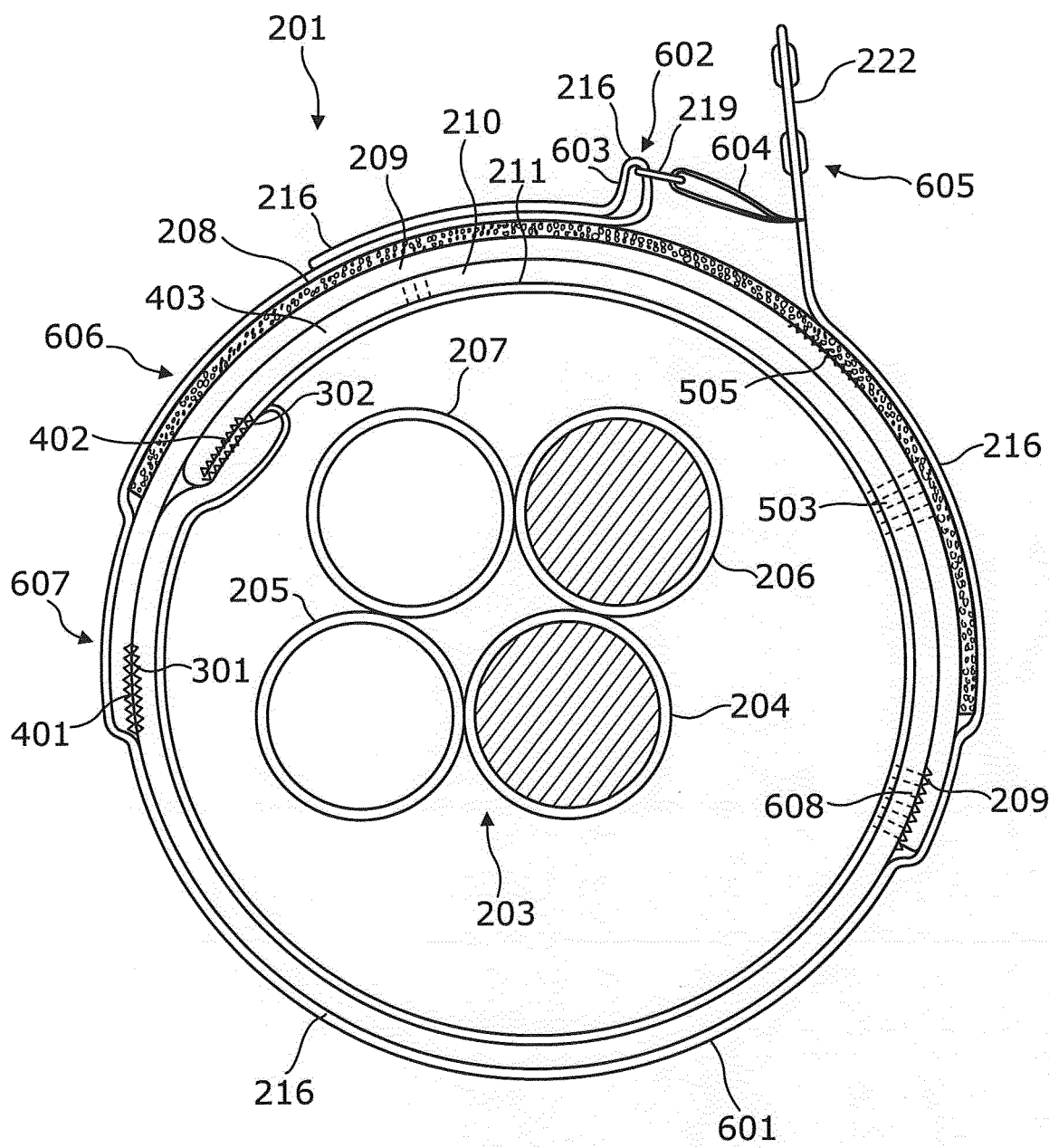
FIG. 6 schematically illustrates an enlarged cross sectional view of the conduit system of FIG. 2 as is taken along the line C-D.

FIG. 6 schematically illustrates an enlarged cross sectional view 601 of the conduit system 201 of FIG. 2 as is taken along the line C-D and which is thus shown as comprising the conduit assembly 203 within the protective cover 202. Cross sectional view 601 is such that sleeve 202 is substantially circular in cross section. However because respective layers 208, 209, 210 and 211 are all flexible then it is to be understood by those skilled in the art that the cross section depicted in FIG. 6 represents the ideal case, such as in particular when the cover surrounds a conduit assembly, wherein the cross section is circular or substantially circular of a circle. However it will be understood by those skilled in the art that, particularly when the cover does not comprise any conduits located within, then being of substantially flexible construction such a cover per is likely to be associated with a cross section that varies in shape along the longitudinal axis of the cover and which is such that at various (or all) points along said axis it comprises an irregular shape that may thus best be described as 'off-circular such as typically more elliptical in nature and/or crumpled in some way and/or constituting a substantially flattened circle if sufficiently pressed down to achieve this shape.

FIG. 6 provides additional clarity as to the interrelationships between the respective layers 208, 209, 210 and 211 and in relation to various other features. Thus, the nature and configuration of fixing strap 216 is shown in further detail such that strap 216 is shown as extending around the entire sleeve over and above outer impact layer 208 in and around the top half of FIG. 6 and over inner impact layer 210 towards the bottom half of the figure. At 602, strap 216 is shown as passing through cinch buckle 219 in order to loop back on itself as is shown at 603. In the best mode, strap 216, as with the other such straps of FIG. 2, comprises a hook and loop type of fixing surface such that the part that loops back over buckle 219 affixes to the remainder of the body of the strap as is located there-below on top of the outer impact resistant layer 208. As indicated by arrow 602, cinch buckle 219 is attached to a hinged piece of material 604, preferably made of the same material as the main body of the strap, which extends in a direction transverse to the main length of the strap. Such a freely moving part 604 facilitates the insertion of the strap 216 through buckle 219 in such a manner as to then enable the strap to be pulled tight. Piece 604 extends away from the main body of strap 216 at a position substantially immediately before the upper end of the strap 605 as comprises a hanging means in the form of eyelet 222. In this manner strap 216 thus encompasses elements that enable the strap 216 to provide both the feature for tightening the strap about sleeve 202 and for hanging the sleeve with conduit assembly within via hanging means 222.

FIG. 6 assists in presenting how and where the respective layers fasten together by way of the primary fastening arrangement as extends in a direction along the longitudinal length of protective cover 202. Thus as indicated by arrow 606 to the left of the figure fixing strip 302 as is located along the outer edge of membrane layer 210 is shown as fixedly attached to and thus adjacent to corresponding fixing strip 402 as is located at the end point of flap 403 of membrane 210. The particular configuration shown in FIG. 6 represents the best mode contemplated. In this regard fixing strip end 402 is external to and thus overlaps strip end 302 and thereby facilitates water and debris runoff in the event that any such water/debris/dust should fall onto the sleeve from above. In this way the fixing arrangement comprising fixing strips 302 and 402 provides a first primary fixing along the length of the sleeve when wrapped. It will be appreciated that if fixing end 302 lay over fixing end 402 instead of the way just described then as these two ends meet, as shown, in the upper half of the sleeve then prevention of ingress of liquid/debris would not be as effective.

As is generally pointed at by arrow 607, FIG. 6 further details the primary fixing arrangement of a wrapped sleeve 202 as is provided by way of fixing strip 301 of membrane layer 210 and fixing strip 401 as is positioned along the internally facing edge of inner impact resistant layer 209. In this way, the arrangement of fixing strip 301 as securely affixes to strip 401 provides a second primary fixing means along the length of sleeve 202. Those skilled in the art will appreciate that the use of a first and a second primary fixing arrangement as just described provides a more secure fixing along the length of sleeve 202 than merely using one or the other. Finally, in the example shown, membrane/liner 210/211 is attached to or near to the distal end of inner impact layer 209 by stitching as is generally indicated at 608 to the right hand side of the figure.

It will be appreciated that FIGS. 5 and 6 are provided merely in order to better illustrate the general interrelationships of the various layers and are not necessarily accurate in terms of the exact lengths of the outer 208 and inner 209 impact layers.

Figure 7:
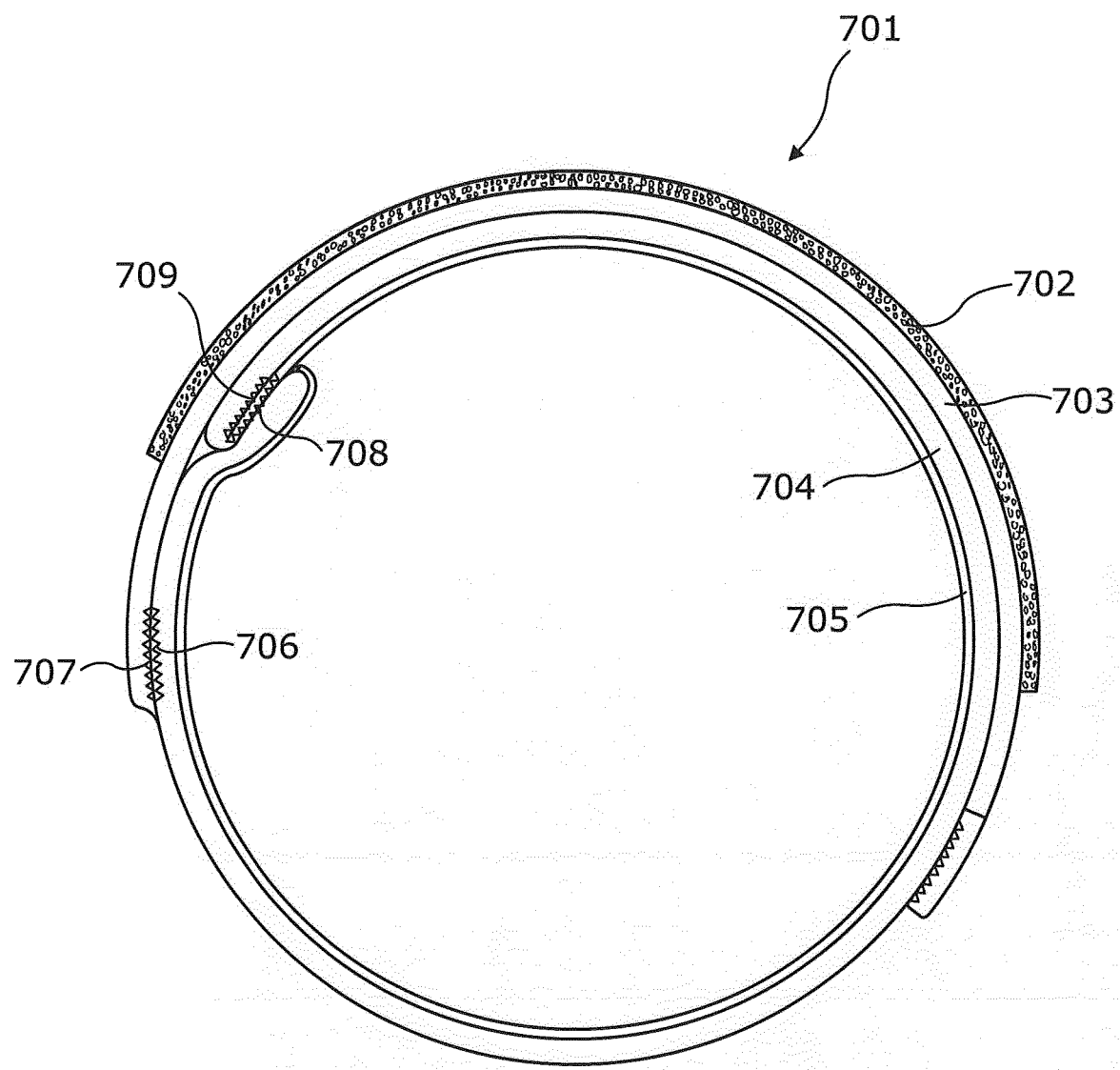
FIG. 7 schematically illustrates, in accordance with the present invention, a cross sectional view of another preferred embodiment of a protective cover as differs from that of the embodiment of FIGS. 2 to 6 by lacking certain features thereof whilst maintain others that are generally as depicted in FIGS. 2 to 6.

FIG. 7 schematically illustrates, in accordance with the present invention, a cross sectional view of another preferred embodiment of a protective cover 701 as differs from that of the embodiment of FIGS. 2 to 6 by lacking certain features thereof whilst maintain others that are generally as depicted in FIGS. 2 to 6. Thus FIG. 7 depicts a conduit protection sleeve 701 that is shown without any conduits in place and which comprises the same general structure as that depicted in the embodiment of FIGS. 2 to 6. Thus sleeve 701 comprises respective outer and inner impact layers 702, 701 and thereunder also a membrane layer 704 and under that a liner layer 705. The embodiment of FIG. 7 also comprises respective cooperating pairs of fixing strips 706 and 707 and 708/709 that substantially mirror those described as respective pairs 301/401 and 302/402 of FIGS. 2-6. However in contrast to the previous embodiment of FIGS. 2 to 6, sleeve 701 does not comprise any integral strap system of the type 216 and its associated features of a buckle 219 and a hanging means 222. This is because the present invention as regards the aspect that relates to the particular sequence of structural layers of a protective cover, such as respective layers 702 to 705 in FIG. 7, is not to be considered as also limited to a cover that comprises a secondary fixing arrangement, such as one or more straps, in addition to a primary fixing arrangement of the type that extends along the length of the cover.

Figure 8:
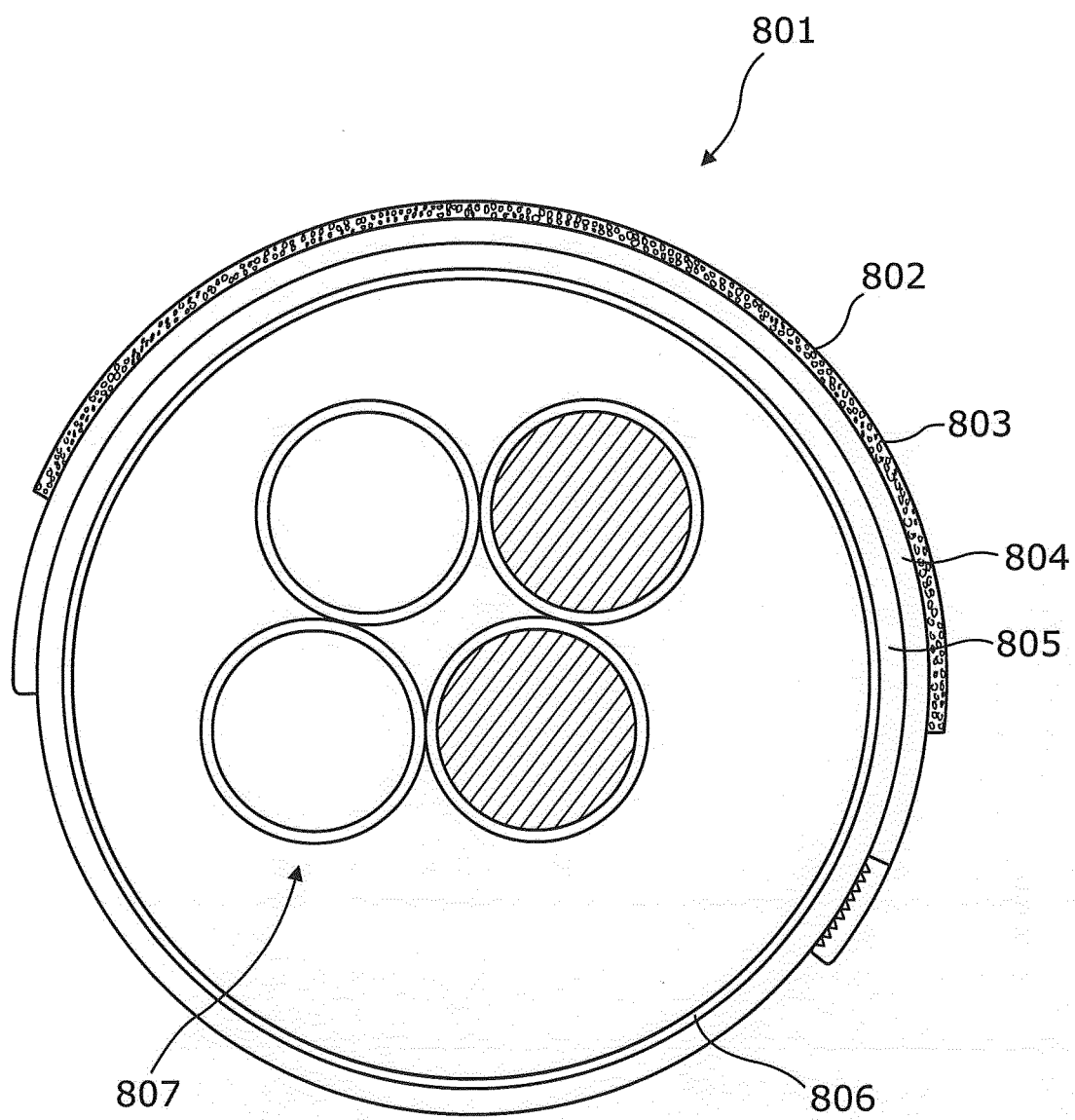
FIG. 8 schematically illustrates, in accordance with the present invention, a cross sectional view of another preferred embodiment of a cover as differs from those of FIGS. 2-7 by virtue of it being substantially configured for permanent fixing to a conduit assembly.

FIG. 8 schematically illustrates, in accordance with the present invention, a cross sectional view of another preferred embodiment of a cover as differs from those of FIGS. 2-7 by virtue of it being substantially configured for permanent fixing to a conduit assembly. Thus protected conduit system 801 comprises sleeve 802 having outer impact layer 803, inner impact layer 804, liquid impermeable membrane layer 805 and liner layer 806 as thus encase conduit assembly 807. However in contrast to the embodiment of FIG. 7, sleeve 802 does not comprise any elongate primary fixing means such as are identified at 706/707 and 708/709 in FIG. 7. Thus, in this example, sleeve 802 is pre-installed about conduit assembly 807 in a factory to thereby create conduit protection system 801. Although not as reusable as the earlier embodiments of FIGS. 2-6 and 7, it will be understood by those skilled in the art that the embodiment of FIG.

8 is substantially of much simpler construction and therefore considerably cheaper to manufacture.

Figure 9:
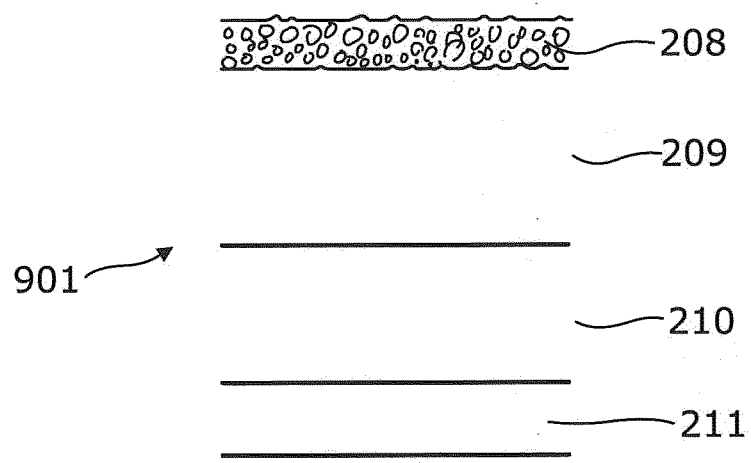
FIG. 9 schematically illustrates, in cross section, the first generally preferred embodiment 901 of the structure of a protective cover as configured in accordance with the present invention, as relates to all of the examples of FIGS. 2 to 8.

FIG. 9 schematically illustrates, in cross section, the first generally preferred embodiment and best mode 901 of the structure of a protective cover as configured in accordance with the present invention, as relates to the examples of FIGS. 2 to 8. Layered structure 901 thus comprises the four structural layers previously described as for example in relation to the embodiment of FIGS. 2 to 6 as layers 208, 209, 210 and 211. In the best mode contemplate a protective cover or guard configured accordingly is such that the guard is made from four different materials performing four different functions as will be described in further detail later on. Further Preferred Mode for Protective Covers as Configured in Accordance with the Present Invention—Three Layer Structure as Per FIGS. 10 to 13.

Figure 10:
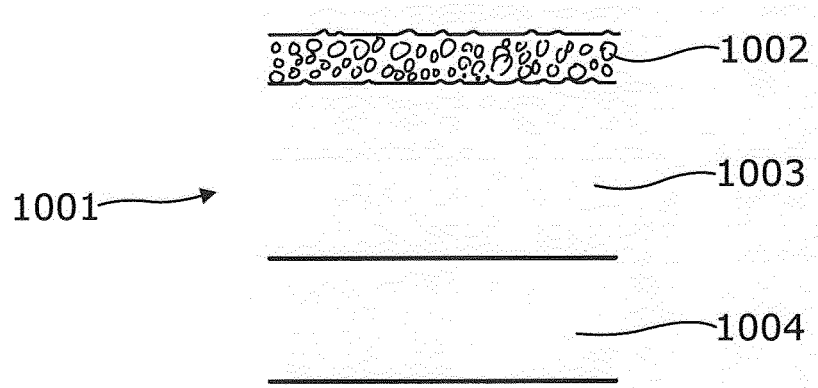
FIG. 10 schematically illustrates, in cross section, a second generally preferred embodiment of the structure of a protective cover which, in accordance with the present invention, comprises three structural layers.

In accordance with the present invention, FIG. 10 schematically illustrates, in cross section, a second generally preferred mode of configuring the structure of a protective cover. In contrast to the best mode as described in relation to FIGS. 2 to 9 the second preferred mode comprises three structural layers. According to the second mode, layered structure 1001 comprises the sequence of material layers as follows:

- outermost layer 1002 of impact protection as forms at least a part of the outermost surface of the sleeve
- inner impact protection layer 1003 as is adjacent to layer 1002
- liquid impermeable membrane layer 1004 as is adjacent to inner impact protection layer 1003 and which is required to be substantially impermeable to at least one liquid which in mining applications at least comprises water. In the present embodiment layer 1004 represents the innermost layer when a protective cover as comprises structure 1001 is wrapped into or otherwise in the form of an elongate cylindrical sleeve.

In accordance with the second generally preferred mode of FIG. 10, the difference to the first generally preferred mode of FIGS. 2 to 9 is immediately apparent from comparing FIGS. 9 and 10. Thus, the second mode as depicted in FIG. 10 is associated with the absence of an inner liner layer that is present in FIGS. 2 to 9 as layer 211. Structural layer assembly 1001 is considered to represent an important broader aspect of the present invention than the structure of the first mode, because it constitutes a structure that may function satisfactorily in particular applications wherein a liner is deemed to not be essential. Such an application may, for example, comprise a situation wherein the amount of dust in the air is minimal, thereby negating the need for a liner below the liquid impermeable membrane.

Figure 11:
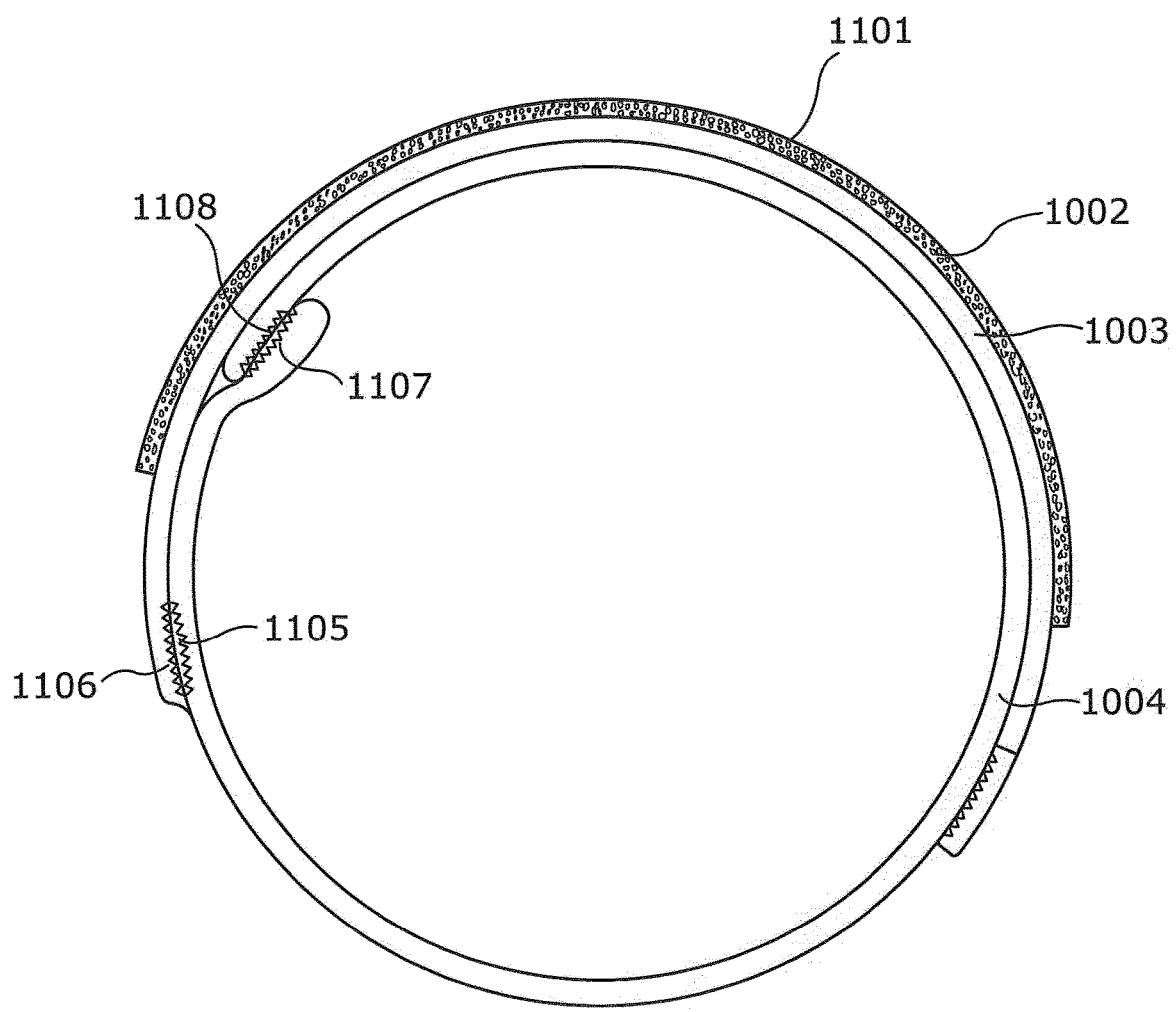
FIG. 11 schematically illustrates, in cross section, a protective cover as configured in accordance with the three layers depicted in FIG. 10 as is to be contrasted with the four layer embodiment that comprises an inner liner layer as per the examples of FIGS. 6, 7 and 8.

FIG. 11 schematically illustrates, in cross section view, a protective cover as configured in accordance with the three layers depicted in FIG. 10 as is to be contrasted with the four layer embodiment that comprises an inner liner layer as per the examples of FIGS. 6, 7 and 8. Thus protective cover 1101 comprises, from the outside going in, respective layers 1002, 1003 and 1004. Thus there is no liner layer below liquid impermeable membrane layer 1004. Save for this difference the structure substantially matches that of the embodiment of FIG. 7 and thus comprises respective pairs of elongate primary fixing means 1105/1106 and 1107/1108 such as are identified in FIG. 7 at 706/707 and 708/709.

Figure 12:
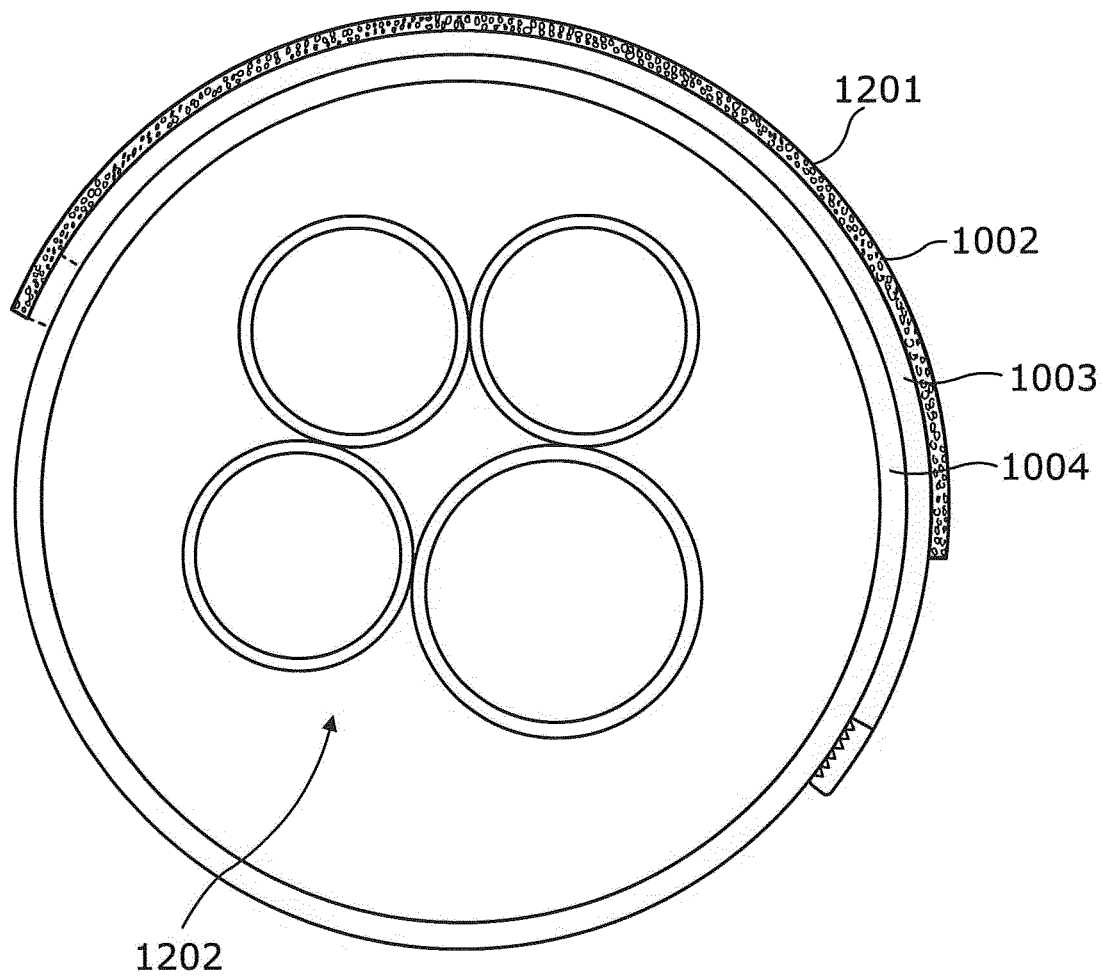
FIG. 12 schematically illustrates, in cross section, another preferred embodiment of a protective cover as comprises the three layers depicted in FIG. 10 and which is shown as substantially permanently fixed to a conduit assembly.

FIG. 12 schematically illustrates, in cross section, another preferred embodiment of a protective cover 1201 as comprises the three respective layers depicted in FIG. 10 of 1002, 1003 and 1004 and which is shown as substantially permanently fixed to a conduit assembly 1202 located within. Notably this embodiment does not comprise any integral hanging means or secondary fixing securement arrangement of the type depicted earlier as straps such as strap 216. However it is to be understood by those skilled in the art that a cover comprising the stated sequence of layers of any of FIGS. 10 to 12 may comprise either or both of a hanging means and a secondary fixing securement arrangement.

Figure 13:
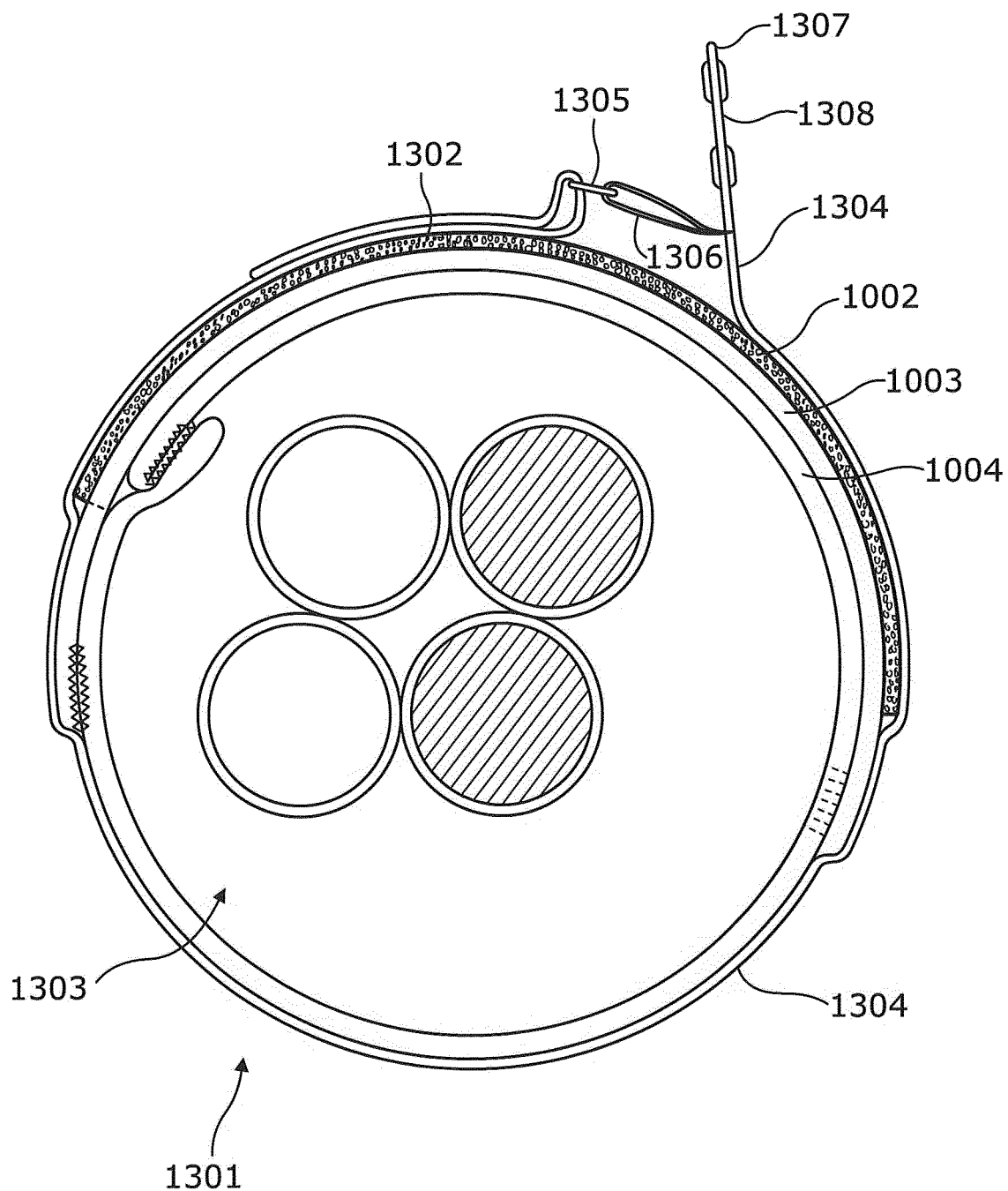
FIG. 13 schematically illustrates, in cross section, another preferred embodiment of a protective cover as comprises the three layers of depicted in FIG. 10 and which comprises a removable sleeve (as is shown around a conduit assembly) and which also comprises a combined hanging and securement strap.

FIG. 13 schematically illustrates, in cross section, another preferred embodiment of a protected conduit system 1301, as comprises the sequence of three respective layers 1002, 1003, 1004 as depicted in FIG. 10 and which comprises a removable sleeve 1302 as is shown around a conduit assembly 1303 and which also comprises a combined hanging and securement strap 1304. As in the embodiment of FIG. 6, the securement strap 1304 is configured to pass around the sleeve to engage with a cinch buckle 1305 as is attached to a holding piece 1306 as extends transverse to the main body of strap 1304. There is also provided a hanging arrangement piece as comprises a suitable attachment means, such as eyelet 1308 for connecting with an overhead wire (not shown) in order to suspend conduit system 1301 therefrom. Exemplary Compositions and Details of Suppliers of the Various Layers of the Preferred Embodiments of a Protective Cover of the Present Invention As regards the aspect of the present invention that relates solely to the sequence of structural layers of a given protective cover, the four layer best mode embodiment corresponds to that of the three layer embodiment save for the presence of an additional layer that effectively constitutes an inner liner. All four layers are described in further detail below.

Outer Impact Layer—Layer 208, 702, 803 for the Four Layer Embodiment and Layer 1002 for the Three Layer Embodiment The outer impact layer is positioned adjacent to the outer surface of the inner impact layer. It is structurally configured to protect the inner impact layer from external bodies that may otherwise potentially induce tear damage, such as cuts and holes. In the best mode contemplated this layer comprises a knitted mesh constituting a mail armour layer of a suitable metal or alloy (e.g. stainless steel) mesh. As those skilled in the art will appreciate such a flexible armour layer, as is otherwise generally termed 'chainmail', effectively comprises rings or links. This outer impact layer is thereby configured to provide an added outer cover to withstand sharp cutting edges of falling debris from penetrating through inner impact layer (layer 209, 703 and 804 in respective FIGS. 2, 7 and 8) and damaging the hose/cable there-below.

Suitably the outer impact layer comprises at least one layer of such chainmail, but may equally, in order to provide enhanced protection, comprise two or more such component layers as are preferably affixed to each other. In the best mode, two such adjacent component layers are fastened together at various points are provided wherein the diameter of the orifices within the chain mail are preferably in the range of 2 to 10 mm and more preferably 2 to 5 mm such that the preferred spacing is approximately two strands per centimeter. The diameter of the wire that the mesh is made from is selected according to the requirements of a given application and may range from around 0.2 mm to 1 mm and preferably is of 0.35 mm. Such a layer may, for example, be constructed from Knitmesh™ as supplied by the company 'Knitmesh Limited' as is incorporated in the Kingdom (www.knittmeshtechnologies.com). Strips of suitable material include the product having Stock Code No. 1.3652E+11

'Layflet knitted wire mesh sock, stainless steel 304L wire 2×0.28 *mm diameter*'. Such strips are 150 mm wide and may be supplied in whatever length is required. Two or more such strips may then, if required for a given application, be sewn together using stainless steel wire.

Inner Impact Layer—Layer 209, 703, 804 for Three Layer Embodiment and Layer 1003 for Four Layer Embodiment This layer is made of or substantially comprises a high impact resistant material that is structurally configured to provide substantial protection from the force associated with impacting projectiles originating from the external environment whilst also being configured to substantially resist internally generated forces of the type that are typically associated with a burst hose.

In the best mode contemplated this material suitably comprises an aramid-based material that is suitably in the form of a fabric. In this specification the term 'aramid' is used to describe any of a class of synthetic polyamides that are formed from aromatic monomers. As is known to those skilled in the art, aramid fibres are a class of heat resistant and strong synthetic fibres as are used in, for example, aerospace/military applications for ballistic-rated body armour fabric and ballistic composites, in bicycle tyres and the like and the name 'aramid' derives the class of materials known as aromatic polyamides.

In connection with the present invention a preferred embodiment of such an aramid is that known by the trade name Kevlar as will be well known to those skilled in the art. 'Kevlar' is a registered trade mark of the company DuPont™ and as will be known to those skilled in the art the chemical name is Poly (p-phenylenterephthalamid) or 'PTA' Kevlar® aramid withstands high shock impact without failure as is well known for its use in bullet proof vests. In the preferred embodiments of protective covers as configured in accordance with the present invention, the inner impact layer comprises such a ballistic grade Kevlar® aramid, the preferred example of which is made of aramid yarn as is woven into a fabric on a weaving loom. Thus a woven ballistic grade para-aramid synthetic fibre cloth is particularly suitable. A suitable and preferred example of an aramid based fabric is the product sold under the trade name Insulflex® by the company 'ADL Insuflex Inc.' as is incorporated in Canada (www.adlinsulflex.com). The product data sheet provides a product overview which specifies as follows: '*Product Overview: Aramid Fibre Cloth is designed to withstand high heat, while exhibiting the properties of flexibility, abrasion resistance, toughness and tensile strength.*' Insulflex® fabric is further described as a '17 oz Aramid Fibre Cloth' as constitutes 'A high temperature, highly durable Aramid cloth designed from a blend of both Kevlar and Nomex yarns'. It is rated for 343 degrees Celsius continuous heat and 1093 degrees Celsius intermittent radiant heat, has a weight of 578 grams per meter squared, a plain weave, a nominal thickness of 1.27 mm, a warp count of 20 and a fill count of 11. This cloth is 17 oz which equates to 481.94 grams (i.e. approximately 480 grams). Thus, more generally a suitable aramid based material comprises a blend of yarns that form a cloth having a weight over 500 grams per metre squared and which is rated to withstand at least 300 degrees Celsius continuous heat and at least 1000 degrees Celsius intermittent radiant heat. As is known to those skilled in the art 'Nomex' is a registered trade mark DuPont that refers to an aramid polymer that is related to Nylon™ and, in contrast to Kevlar® which is a para-aramid, Nomex is a meta-aramid. A blend of different aramid based yarns is preferred in the construction of a protective cover as configured in accordance with the present invention because it enables desirable properties of a given cover to be engineered according to a specific blend that is selected for a give application to provide the required physical characteristics. Thus, for example, although Nomex® yarn has poorer strength than Kevlar® yarn due to lack of alignment during filament formation, it has excellent thermal, chemical and radiation resistance for a polymer material. Thus, an appropriate blend of 'Nomex' yarn (or a related aramid polymer as related to Nylon™) with Kevlar yarn produces a cloth (such as the above-referenced 'Insulflex' cloth) that has improved thermal, chemical and radiation resistance as compared with a protective cover made only of Kevlar® yarn.

It will be understood by those skilled in the art that for applications that require even greater impact strength than is provided by a single sheet of such fabric, the inner impact resistance layer may itself, instead of comprising only a single layer, comprise two or more layers.

Liquid Impermeable Membrane Layer—Layer 210 of FIGS. 1 to 6 and 9; Layer 703 of FIG. 7, Layer 804 of FIG. 8, Layer 1004 of FIGS. 10 to 13

In accordance with the present invention, this layer is adjacent to the inner impact layer and comprises a membrane that is substantially impermeable to the passage of at least one liquid, such as water, from the external environment. In the best mode contemplated this layer is configured of a strong and durable material such as a polymer coated glass cloth which acts as a waterproof barrier to stop mine water and dust particles penetrating through to the outer cover of a hose/cable assembly as is located within the cover. More generally the main body of a liquid impermeable layer as configured in accordance with the present invention may substantially comprise of any material that is suitable for a given application where the cover is to be used. Thus, for many applications a fibre based cloth that is sufficiently strong and durable will suffice, glass cloth being such a fibre based cloth that is low cost, generally resistant to chemical attack, flame retardant as well as being readily available and low cost. A polymeric coating of silicone rubber is generally found to be suitable for many applications because of its resistance to heat, chemicals of various kinds and relatively low cost. In general a coating will be suitable, but by the term 'coating' it is to be understood in this specification that this is to be interpreted as not only an 'outer' coating, but such that it also includes the situation where the main body is configured such that the polymer is effectively impregnated into/throughout the fabric layer of the main body. In this way the term 'membrane' as used herein is to be interpreted as covering both situations.

As described earlier, in view of typical hose in mines comprising carbon steel fibres in order to provide reinforcement of the walls of hose, the need to prevent water from, for example the roof of a mine, coming into contact with any exposed fibres as may exist in such hose walls is highly desirable. Thus, provision of the liquid impermeable membrane layer described facilitates prevention of or at least substantial reduction of corrosion and abrasion as would otherwise typically be caused by ingress of water and/or dust particles.

A preferred material for the liquid impermeable membrane layer is that of 'silicone rubber coated glass cloth' as supplied by the company 'THS Industrial Textiles Limited', as is incorporated in the United Kingdom (http://www.th-stextiles.co.uk). The product data sheet refers to the product as 'Style 8333SR148, 460 grms per sq. metre' and having a base cloth constructed of 19.2 ends per cm, 8.0 picks per cm, 0.40 mm fabric thickness, yarn count of EC9 136 tex warp and EC9 136 tex weft and a fabric weight of 410 grms per square metre. The base cloth has a temperature resistance such that it is described as being able to withstand 550 degrees Celsius. Furthermore the product comprises rubber coating of silicone rubber of 50 grms per square metre on one side of the fabric and having a temperature resistance of 220 degrees Celsius for continuous use and up to 250 degrees Celsius for short periods.

Other forms of liquid impermeable material may be used to configure an appropriate liquid impermeable layer for particular applications. Thus, for example, in applications where protective covers as configured in accordance with the present invention are required to be impermeable and resistant to corrosive oils, acids, bases and the like, a highly resistant coating such as of Polytetrafluoroethylene (PTFE) may be used instead of silicone rubber. However other polymers that are considered to be suitable for certain applications comprise, for example, polyvinylchloride (PVC), poly (ether ketone) ('PEEK'), polyetherimide (PEI) or neoprene rubber. In this specification the term 'neoprene' is used to describe a synthetic rubber made by the polymerization of chloroprene.

In accordance with a preferred embodiment of the present invention the liquid impermeable layer is specifically configured to substantially resist internally generated forces of the type that are typically associated with a burst hose. In this way the risk of a hydraulic hose burst as may arise with known hoses in underground mines is substantially further reduced by providing an additional layer to penetrate through that thereby supplements the primary protection from an internal burst as is provided by the inner impact layer as described hereinabove.

Sleeve Liner Layer 211 as Prevents Membrane Layer 210 from Directly Contacting the Conduit Assembly This layer is specific to the first general embodiment as comprises four layers as per FIGS. 2 to 9 and not to the second general embodiment as comprises three layers as per FIGS. 10 to 13. As is known to those skilled in the art in underground mining and in industry more generally, basic flexible sleeve covers are commonly used to cover conduits of various kinds in mines and the like in order to provide protection against abrasion damage. Such basic covers are suitably made of a polyamide, such as Nylon™ and typically comprise a bulked mesh type material that protects a hydraulic hose (or a cable, chain, wire or other conduit) from abrasion and degradation.

Such covers are convenient for use as a liner layer in the present four layer embodiment of the present invention. In addition to acting as a liner to assist in preventing abrasion such a liner also offers some albeit limited protection from the effects of pinhole occurrences from and of providing leakage containment in hoses. A suitable liner for a given application will have an appropriate melting point, such as for example, of 210 to 220 degrees Celsius as well as good resistance to atmospheric agents and aging and good compatibility with such chemicals/agents as gasoline, oil, alcohols, diluted bases, diluted acids, benzene, acetone, ether, carbon tetrachloride, chlorine based solvents and mildew/bacteria.

As those skilled in the art will appreciate, a liner made from a material that has been approved by a regulator, such as the Mine Safety and Health Administration (MHSA) in the USA is desirable and/or required for particular applications. Thus, approval for use in underground mines as per IC171/1 as relates to flame resistance is generally of a suitable safety standard. Similar standards exist in the UK, and thus approval by UK Coal in accordance with the Fire Resistance and Anti-Static requirements of former British Coal Corporation Specification 182 of 1986 (BCC Spec 182) is, depending on a given application either required or at least preferred.

Lloyds Testing and Certification

As will be known to those skilled in the art, Lloyds Register EMEA, hereinafter referred to as 'Lloyds' is a member of Lloyd's Group Limited, a company incorporated in the UK. A protective cover constructed according to the three layers specified below has been tested and verified by Lloyds according to the test procedure 'Lloyds Register Type Approval system—Procedure TA02:2002' to withstand a 10,000 psi hydraulic fluid injection burst:

Outer impact layer comprised of the above-referenced specified layer stainless steel Knitmesh™ at 0.35 mm diameter fine mesh;

Inner impact layer comprised of the specified layer of Insulflex®; and

Liquid impermeable (waterproof) membrane layer comprised of the specified layer of silicone rubber coated glass cloth.

The relevant test certificate issued on 3 Jun. 2015 as 'Certificate No. 15/90003'. This combination of layers may be used to construct a sleeve as configured with or without an inner liner and thus represents a Lloyds tested combination that applies to the stated combination as forms a part of the general structural mode of a four layer protective cover (as per FIGS. 2 to 9) as well as to the general structural mode of a three layer protective cover as per FIGS. 10 to 13.

In the UK and elsewhere, those skilled in the art will appreciate that mines commonly operate up to fluid pressures of 5000 psi in hydraulic hose and the like. It is thus an industry standard to ensure that such hose operate to 1½ times the operating pressure (i.e. 7500 psi). It is thus to be understood that covers as configured in accordance with the present invention as per the embodiment tested by Lloyds were tested to well beyond the 1½ times safety factor (7,500 psi) and instead up to 2 times the safety factor (10,000 psi). In the best mode contemplated a cover as configured in accordance with the present invention should thus be such that internal hose bursts of up to and including 7,500 psi should be contained. More specifically at least the inner impact layer (layer 209, 703, 804 for three layer embodiment and layer 1003 for four layer embodiment) should be able to withstand an internal hose pressure of up to and including 7,500 psi and it is preferable that the impermeable layer is likewise able to withstand such a pressure.

Further Aspect of the Present Invention—Improved System for Suspending a Covered Conduit Assembly from a Support Structure The present invention is also considered to comprise an improved system for suspending a covered conduit assembly from a support structure. This improved system may incorporate a protective cover as is configured in accordance with either the first (best) mode or the second preferred mode as described above. However, aspects of this system may equally be used with other forms of protective cover that are thus not as such configured in accordance with the basic structure of either mode 1 or mode 2.

Figure 14:
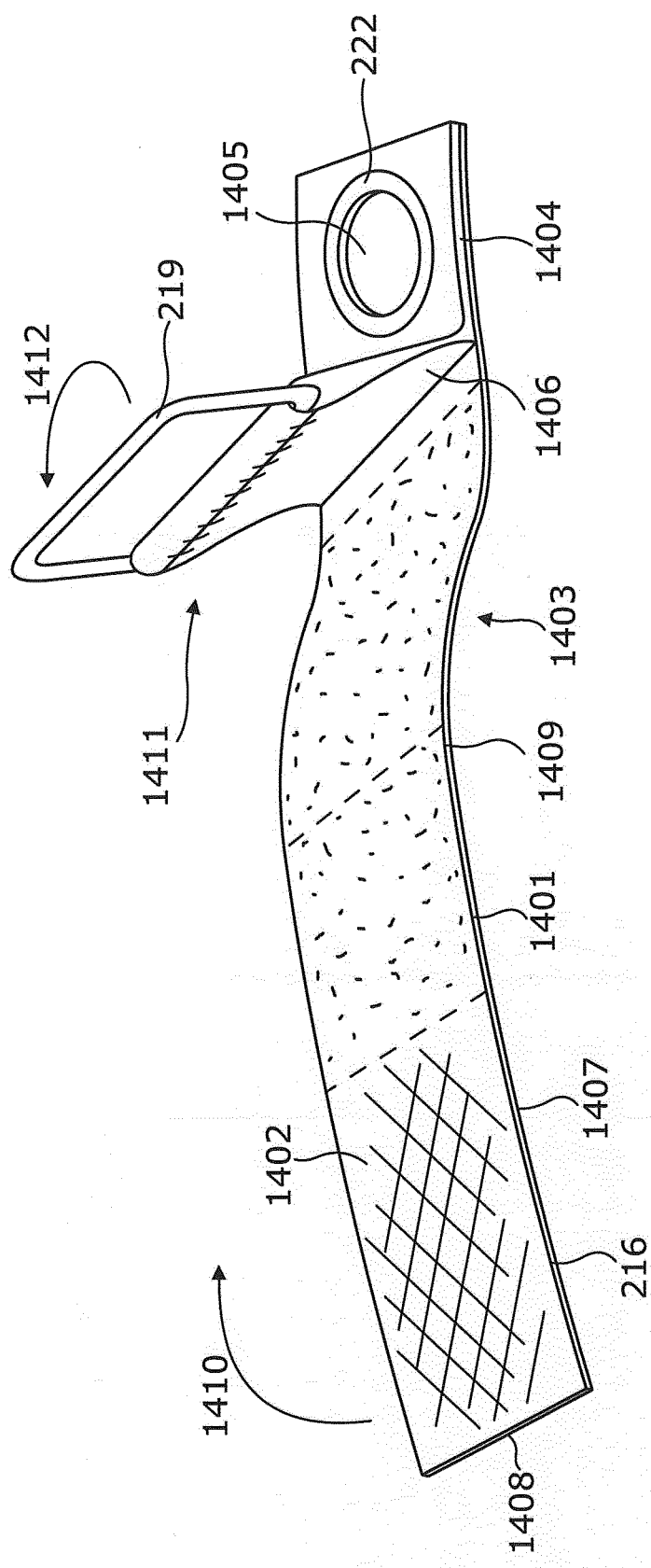
FIG. 14 schematically illustrates, in perspective view, the combined hanging and securement strap as depicted in FIG. 2 and as is also present in FIGS. 3, 4, 5, 6 and 13.

FIG. 14 schematically illustrates, in perspective view, the combined hanging, and securement strap as depicted in FIGS. 2 to 6 and as is also the same as the strap depicted in FIG. 13. Strap 216 is preferably made of nylon webbing type material and comprises an elongate main body 1401 comprises respective upper surface 1402 and underside surface as is not shown in the view taken, but which is generally indicated by arrow reference arrow 1403. At 1404 there is provided at the end of main body 1401 a hanging arrangement comprising an eyelet 222 as surrounds orifice 1405 for receiving an overhead wire. Hanging arrangement or piece 1404 suitable comprises a piece of folded back material of main body 1404 in order to provide a loop which itself then continues to form a further loop piece 1406 as holds buckle 219 in place. In the preferred embodiment strap 216 comprises a fixing surface of hook and loop material. In the example illustrated lower surface 1403 comprises region 1407 close to terminal strap end 1408 which is therefore at the opposite end of the strap to said buckle end and which comprises of hook material. Region 1407 is configured to engage with a longer underside region 1409 which comprises loop type material in order to thereby provide a hook and loop type fixing when the terminal end 1408 of main body 1401 is passed around a given cover to which the strap is affixed or otherwise to be used. Thus end 1408 may be passed first in the direction of arrow 1410 and then second in the direction of arrow 1411 through buckle 219 and back in the opposite direction, as indicated by 180 degree change of direction arrow 1412, over the top part of buckle 219 in order to surround the subject protective cover and once the end 1408 is passed through buckle 219 by a sufficient amount it may be doubled back to bring hook material region 1407 into contact with loop material region 1409. In this way with the non-hook and loop upper side being next to the outer surface of a given protective cover, a cover comprising an elongate longitudinal opening means along its length is thereby further secured.

Figure 15:
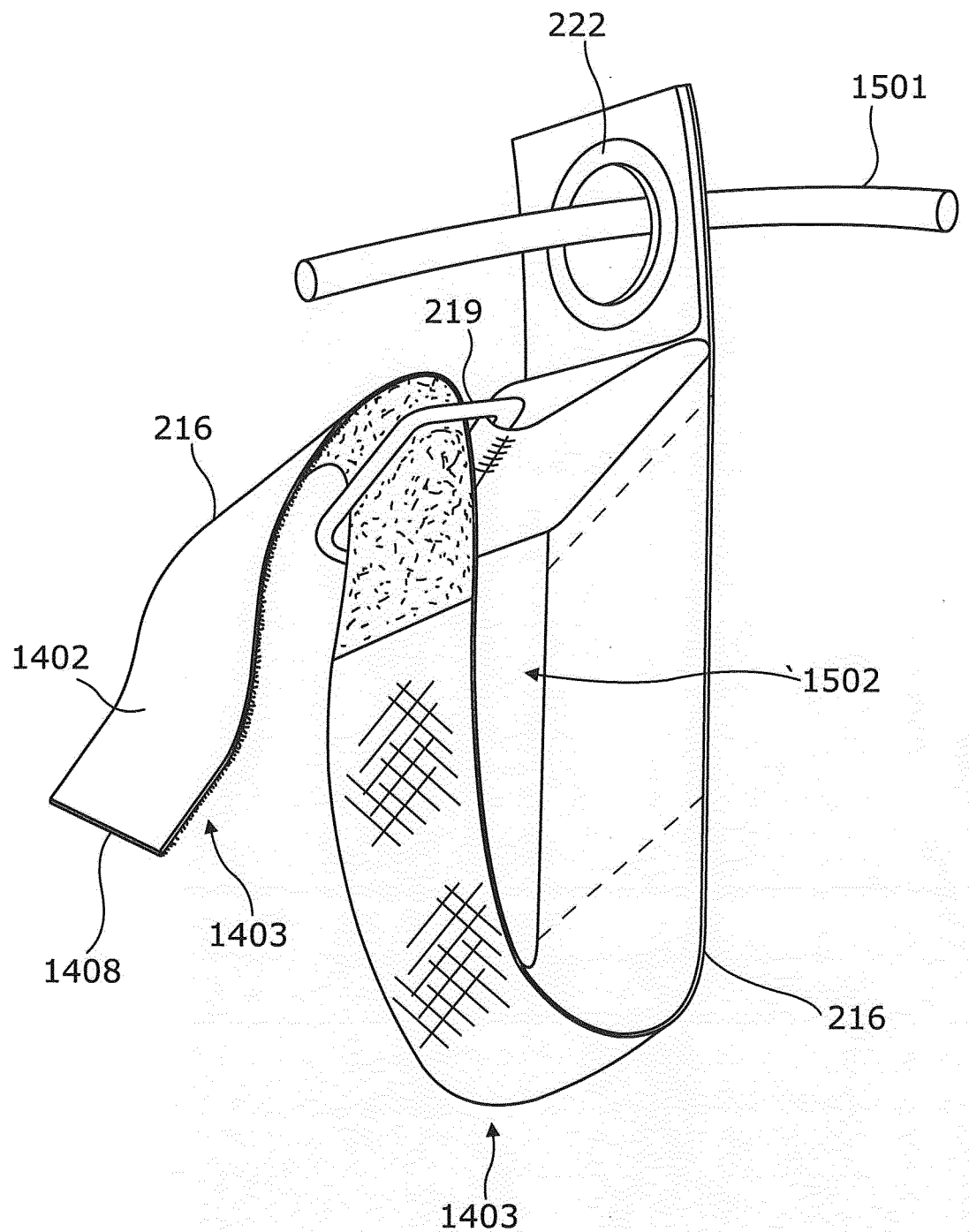
FIG. 15 further details, in perspective view, the operation of the combined hanging and securement strap of FIG. 14.

FIG. 15 further details, in perspective view, the operation of the combined hanging and securement strap of FIG. 14 and illustrates the strap 216 having been passed through buckle 219 as well as then strap being attached to an overhead catenary wire 1501. The strap would, in practice, be used around a protective cover of either of the general structural configurations of FIG. 9 or 10. Although, for purposes of illustration a cover comprising a conduit assembly within is not shown in FIG. 15, such a cover would pass through the hoop in the strap as is shown by direction arrow 1502.

Straps and buckles of the type that may be used to secure and/or suspend a protective cover as configured in accordance with the present invention may take various forms other than those described above. For example, in contrast to the form of a strap as depicted in FIGS. 2-6 and 13-15 the function of a securement strap around the sleeve may be provided by a stand-alone strap that is separate from/not connected to a means on a cover that facilitates suspension from a wire located above. Likewise a securement strap of whatever kind and whether or not integrally connected to a suspension means may operate in any suitable manner that enables it to be tightened around and maintained in position around a given sleeve. Thus rather than a simple cinch buckle having an orifice as is disclosed in, for example, FIGS. 14 and 15 a ratchet strap system may be used to provide a more secure fixing of the strap about a cover.

Figure 16:
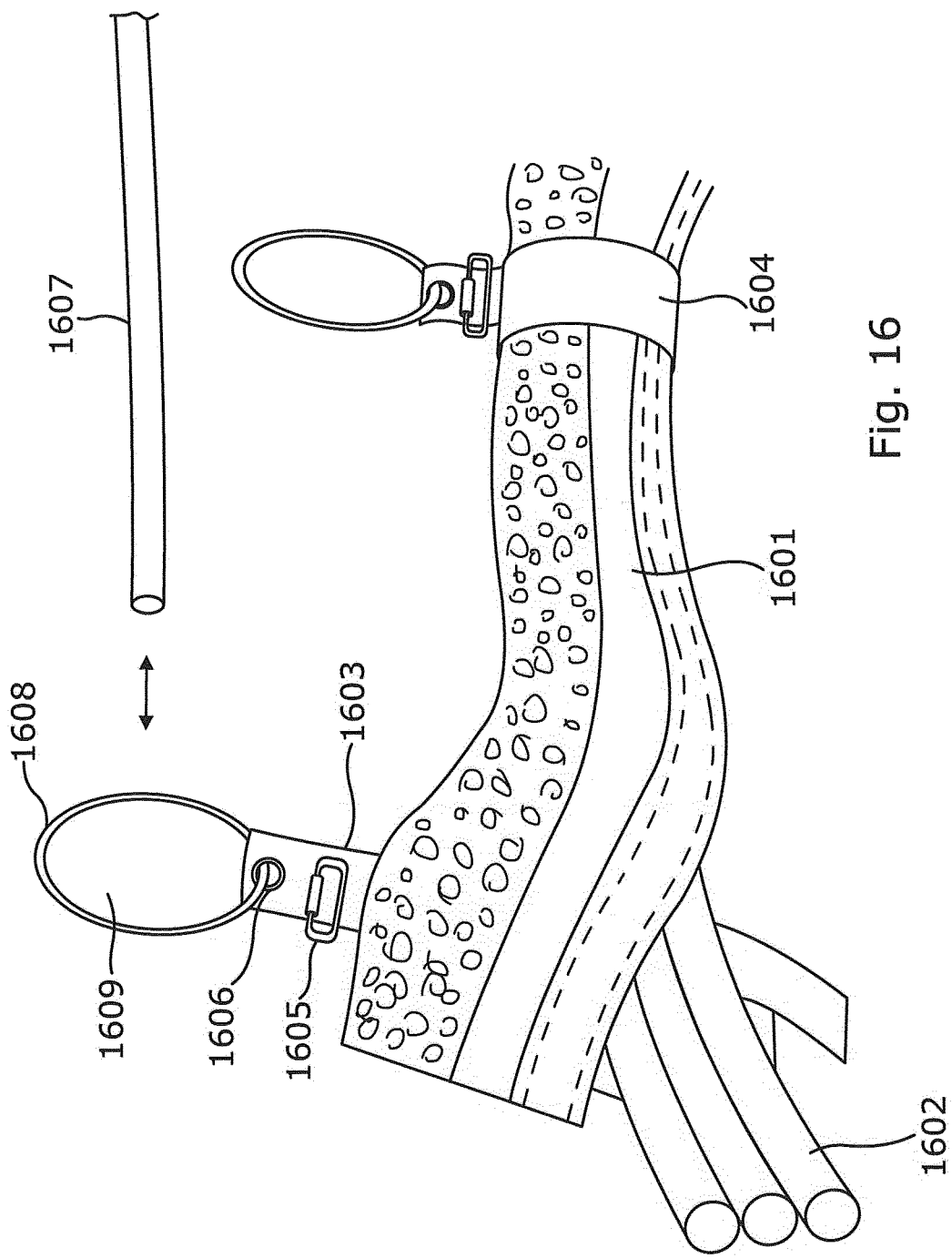
FIG. 16, in accordance with the present invention, schematically illustrates in perspective view the process of covering a conduit assembly in situ in a mine and arranging for the cover to be suspended from a catenary wire as is provided overhead.

FIG. 16, in accordance with the present invention, schematically illustrates in perspective view the process of covering a conduit assembly in situ in a mine and arranging for the cover to be suspended from a catenary wire as is provided overhead. Thus elongate cover 1601 is shown as partially wrapped around conduit assembly 1602, cover 1601 thus comprising a primary elongate fixing arrangement along the length of the cover such as by way of respective fixing strip pairs 302/402 and 301/401 of FIGS. 3 and 4 or 706/707 and 708/709 of FIG. 7. Cover 1601 additionally comprises secondary securement fixing straps 1603 and 1604 as circumvent the outer surface of the cover. Strap 1603 comprises a cinch buckle member 1605 and a hanging eyelet 1606 of the type described hereinbefore, eyelet 1606 being configured to attach in some way to an overhead support wire 1607. In the example the attachment thereto is via a wire ring which passes through eyelet 1606 such that the orifice 1609 in wire ring 1608 is configure to receive overhead support wire 1607.

Figure 17:
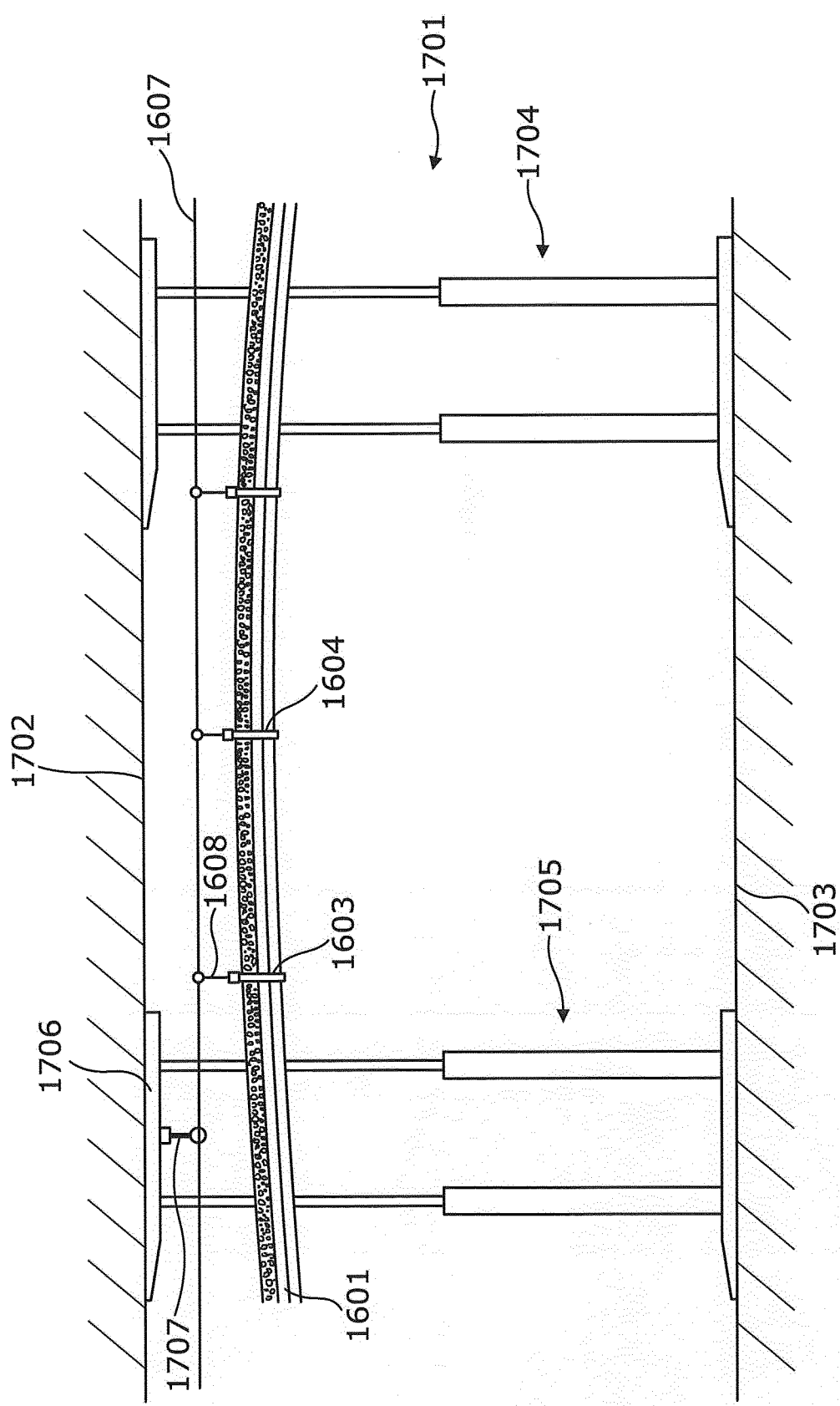
FIG. 17, schematically illustrates, in accordance with the present invention, an improved overhead cable and hose suspension system as may suitably be contrasted with the prior art system depicted in FIG. 1.

FIG. 17, schematically illustrates, in accordance with the present invention, an improved overhead cable and hose suspension system as may suitably be contrasted with the prior art system depicted in FIG. 1. Elongate protective cover 1601 of FIG. 16 is shown extending along a tunnel 1701 of an underground mine such that cover 1601 is suspended from overhead wire 1607 by straps such as 1603 and 1604 of FIG. 16. Mine tunnel 1701 comprises roof 1702 and floor 1703 with respective chocks 1704 and 1705 being in place to securely hold up roof 1702. Overhead wire 1607 is in the form of a catenary shape as passes along a considerable distance of the length of the tunnel as compared with the relatively short length of the portion of the tunnel that is shown in the figure. Thus support wire 1607 is supported from chock canopy 1706 of left hand chock 1705 via overhead hanger 1707 as shown on the left hand side of FIG. 17 and similarly overhead wire 1607 is suspended on the other side of the figure, but outside of the field of view depicted and this further to the right than right hand side than chock 1704. Suspension of overhead wire 1607 in this way assists in taking some of the impact force of falling debris such that the full impact force thereof is not felt as such by the upper surface of cover 1601 or by the attachment straps such as those depicted at 1603 and 1604. The latter is highly beneficial because otherwise the attachment straps if not used in conjunction with a flexible catenary wire that may swing from side to side and, to some extent, along the direction of its longitudinal axis are prone to damage and/or potentially complete failure from such impacting forces.

The overhead wire is more broadly to be considered as any elongate flexible member that is in the form of a slender strand such as, for example, a metal wire that is suspended from above from a suitable supporting structure. Such a flexible strand may suitably comprise a wire as is made of a corrosion resistant material such a stainless steel. The important point is that the flexible strand must be such that it is suspended from the supporting structure in such a way that it assumes the shape of a catenary, that is, a curve as is, for example, known to be assumed under the force of gravity by a heavy flexible cord that hangs freely from two points. Thus, such a flexible strand should not be affixed to the supporting structure such that it is overly taut as it is required to form a catenary shape in order to allow it to absorb impacting forces by virtue of it being able to swing from side to side and along the direction of the longitudinal axis of the strand.

The guards as configured in accordance with either the first (best) mode of four structural layers as per FIG. 9 or with three as per FIG. 10 in relation to the second preferred mode of construction are such that they are associated with substantial weight as compared with, for example, a prior art guard comprised only of a nylon mesh. In addition in large mines in countries such as Australia and the USA, the hose and cable systems are much larger than in the UK with the consequence that substantial overall weight is involved. In the UK a typical conduit to be covered is about 1.5 m long whereas in larger mines they may be two or three times longer, such as, for example, around 4 m long. This is another reason for inclusion of secondary fixing supporting straps such as 214, 215 and 216 of FIG. 2 as these, in conjunction with a catenary wire or strand there-above provide additional support along the length of a give supported cover assembly. As will thus be appreciated by those skilled in the art such straps and a catenary wire which runs the full length of a given cover as suspended there-below thereby act and function as a brace against end termination pull at the respective ends of any conduits as are supported/protected within by the cover.

The primary fixing means comprising, in the best mode, hook and loop fixing strips such as of the make Velcro® (see pairs 301/404 and 302/405 of FIGS. 3 to 6 and 706/707 and 708/709 of FIG. 7) are required to be constructed according to the requirements of a given application and for use in a given mine these are required to be fire resistant to the required standard that is specified for the mine.

Secondary securement straps such as straps 214, 215, 216 of FIGS. 2-6, strap 1304 of FIG. 13, strap 216 of FIGS. 14 and 15, strap 1603 of FIG. 16 and straps 1603, 1604 of FIG. 16, are preferably configured to facilitate suspension of a given cover from above as well as providing securement around a given conduit assembly. An example of suitable strapping, readily obtained from most good manufacturers of packaging materials comprises woven polyester strapping of width 38 mm as typically sold in a roll of 100 m. Anti-static fire resistant phosphated buckles are highly preferable and typically required for use in mines. The company Samuel Grant (Sheffield) Limited as incorporated in the United Kingdom (www.samuelgrant.co.uk) is able to supply such a roll of strap material and also phosphated buckles. These may then, in accordance with the present invention, be assembled together along with, if required, a suitable hanging eyelet or hook to provide strap unit of the type exemplified in FIGS. 14 and 15 herein.

The primary fixing means comprising, in the best mode, hook and loop fixing strips such as of the make Velcro® (see pairs 301/404 and 302/405 of FIGS. 3 to 6 and 706/707 and 708/709 of FIG. 7) are required to be constructed according to the requirements of a given application and for use in a given mine these are required to be fire resistant to the required standard that is specified for the mine.

Protection of the hoses and cables in mines such as run through the coal face line in a coal mine is, as explained earlier, important in order to ensure prevention of damage. Debris from the roof fall in-between the supports damages the covers of the hoses and the cables in two ways. Firstly, the cover suffers from splits and cuts which then expose the support wires of the cable and hose; mine water that egresses the mine and water from the coal cutting operations rusts the wires and in the case of the hoses a catastrophic failure will typically result in a burst of the hose. Due to the confined space on a coal face the hoses are very close to the operators and therefore any such burst is highly dangerous and may result in a hydraulic injection and or the striking of an operator as well as down time of coaling operations. Such a burst hose must therefore be replaced as quickly as possible because such a burst will result in coaling operations stopping for about 30 minutes.

The second type of damage, being that debris falling and hitting the hoses (and cables), shocks the hose termination (and cable) termination points resulting again in catastrophic failure of the hose with the same results as above. Electricity cables also suffer from this shock damage, the result being breaks in the continuity of the wires and communications systems of the roof supports. A more dangerous type of damage to the cables results from a build-up of resistance within the system due to cable core damage. If this is not managed the powered roof supports (chocks) can and do suffer from spurious commands of operation known as 'ghost primes' such that a roof support may/will thereby operate without an instruction from an operator. In such circumstances, the support may advance with little warning resulting in the trapping of an operative and such that only serious injury and/or death will be the result. There is also the additional known/related problem in mines of water egress into a cable which will also affect the operations of the roof supports and resulting in coal operations stopping.

Adding inter chock cable/hose protection guards will, in general, reduce the above problems and the design of the additional covers as per the preferred embodiments of the present invention as described hereinabove will reduce the amount of damage caused to the covers of the cable and hoses.

In accordance with the best mode of the present invention the conduit covers are secured, at least at each end thereof, to a catenary wire via a stainless steel cable in the form of a hoop such as hoop 1608 of FIG. 16. Use of such a securing cable hoop further reduces the effect of shock load on the protected hoses and cables within. If however a hose was to burst the covers as configured in accordance with the present invention will resist the substantially instantaneous and otherwise piercing jet of escaping fluid in order to thereby dissipate it over a wider area and thus to prevent it from directly hitting an operator. Typically high pressures as arise in hoses in mines and other industrial applications concern hydraulics, such as in operation of chocks, and may, for example, comprise working pressures of around 800 kPa to 2000 kPa and burst pressures of up to around 8000 kPa.

The conduit assembly covers as configured in accordance with the present invention fall into two basic types. Type 1 comprises a bespoke wrap around guard. This guard can be installed around one or more hoses and cables and can also be installed without the need to remove the hoses or cables from their termination connections. Type 2 comprises a guard that is configured to be installed to an individual hose or cable. This second type of guard may be installed directly on a conduit in factory conditions, but it is also considered possible in certain applications for it to be to be installed in-situ at a given work site.

The preferred embodiments of the present invention as described hereinabove are not to be considered as restricted to the angular coverage of each given layer shown in the figures or as hereinbefore described. For economic reasons a cover as configured in accordance with the present invention may comprise the respective layers which each respectively extend around a given conduit by a certain required amount which may be, for each given layer, up to and including 360 degrees coverage such that a given layer thereby wholly surrounds the conduit. Thus, depending upon a given application, each respective layer of a cover of the invention may circumvent a conduit or be configured to circumvent a given conduit by whatever degree of coverage is required. Full coverage (360 degrees) for a given a layer will evidently be most expensive in terms of the amount of material used with the cost thereof being proportionally lower as the amount of material used is reduced. Likewise it is to be understood that the layering of the invention that is disclosed may result in a variety of covers as regards differences in overall flexibility, the desired flexibility being determined by the flexibility of each particular layer in the cover and as found to be suitable for a particular application.

In view of the description of the preferred embodiments above, certain key advantages and benefits of the present invention may be summarized as follows:

For cables and hoses the catenary system is designed and configured to carry and spread the weight of such conduits and thus prevent the externally induced shock impact load of large lumps of debris damaging the cable/hose bodies and to prevent disturbance of and/or damage to the end termination connector points of hoses.

The catenary wire system of hanging a conduit assembly from a roof support thus prevents an external shock load, such as caused by rubble falling from the roof of a mine, from causing a mechanical pull on the hose end fittings which thereby prevents a hose failure from occurring.

For the high pressure hoses, the combination of Lloyds tested materials to protect from the internal force of a high pressure fluid burst, penetrating to the atmosphere and possible injury to the workers.

Coal face lines that utilize inter chock covers as configured in accordance with the present invention will be much more cost effective and environmentally friendly than without. Notably the inter chock hose covers will vastly extend the working life of the hoses protected within. In contrast, as will be understood by those skilled in the art, traditionally most mines would normally change all the interconnecting hoses at the end of each installation. Thus, the present invention facilitates greater reusability of hoses and cables as well as the covers themselves An example of hose and/or cable costing and the cost-benefit of protective covers as configured in accordance with the present invention is provided:

The cost of the inter chock hoses depends on the bore and length. Taking a typical bore of 1¼" Pressure and 1½" Return and 2.2 meters length an estimated cost of an installation can be derived.

Thus, by way of example, taking pressure hoses as £112.26 each and return hoses £120.35 each, then a coal face line of 235 roof support would thus typically be in the region of £54,663.00 for the sum of all such hoses. A substantial saving in costs of operation of a mine may thus be achieved through reusability of hoses, but also through vastly improved safety with resultant lower overall costs in terms of health and safety law and compliance and liability, issues.

A similar type of calculation may be made for cables comprising command cables and inter-chock cables: Inter chock cable hose covers as configured in accordance with the present invention will retail at a cost depending on their size and on a given application. Thus, deploying covers as configured in accordance with the present invention should substantially (i) improve the safety of personnel and (ii) reduce the overall running costs for a given application, such as an underground mine.

What is claimed is:

1. A protective cover for surrounding a conduit assembly in a mine, the protective cover comprising:
   a flexible elongate main body comprising a plurality of discrete functional layers and configured to form a sleeve with an outer side and an inner side, the plurality of functional layers including:
      a first layer substantially comprised of an aramid-based material, the first layer structurally configured to provide substantial protection from a force associated with impacting projectiles originating from an external environment and furthermore configured to substantially resist internally generated forces associated with a burst hose, the first layer comprising an outer surface facing outwardly when the sleeve is formed and an inner surface facing inwardly when the sleeve is formed;
      a second layer arranged adjacent to the outer surface of the first layer, the second layer structurally configured in the form of a mesh and protecting the first layer from external bodies that may otherwise potentially induce tear damage to the first layer; and
      a third layer arranged adjacent to the inner surface of the first layer and comprising a polymeric membrane impermeable to at least one liquid;
   one or more points of attachment configured to attach the protective cover, when the sleeve is formed, to a flexible strand and suspend the sleeve from the flexible strand, wherein the one or more points of attachment comprise a hanging means, wherein the hanging means comprises:
      an eyelet providing an orifice configured to receive the flexible strand;
      a wire ring passing through a first orifice of an eyelet and providing a second orifice configured to receive the flexible strand; or
      a hook providing an open ring configured to receive the flexible strand.

2. The protective cover as claimed in claim 1, wherein the aramid-based material of the first layer comprises a fabric of woven ballistic grade para-aramid fiber.

3. The protective cover as claimed in claim 1, wherein the aramid-based material of the first layer comprises poly-paraphenylene terephthalamide (PPTA).

4. The protective cover as claimed in claim 1, wherein the aramid-based material of the first layer comprises a blend of yarns selected from meta-aramids and para-aramids.

5. The protective cover as claimed in claim 1, wherein the aramid-based material of the first layer comprises a blend of yarns that form a cloth having a weight over 500 grams per meter squared and rated to withstand at least 300 degrees Celsius continuous heat and at least 1,000 degrees Celsius intermittent radiant heat.

6. The protective cover as claimed in claim 1, wherein the third layer is substantially impermeable to water from the external environment.

7. The protective cover as claimed in claim 1, configured to protect a hose containing one or more internal liquids that are selected from the group consisting of water, acids, oils, bases, and compositions thereof, wherein the third layer is substantially impermeable to at least one of the internal liquids of said group.

8. The protective cover as claimed in claim 1, wherein the third layer is additionally specifically configured to substantially resist internally generated forces typically associated with a burst hose.

9. The protective cover as claimed in claim 1, wherein the third layer comprises a fiber-based cloth comprising a polymeric coating.

10. The protective cover as claimed in claim 9, wherein the fiber-based cloth is glass cloth.

11. The protective cover as claimed in claim 9, wherein the polymeric coating comprises a coating of silicone rubber or of PTFE (polytetrafluoroethylene).

12. The protective cover as claimed in claim 1, wherein the mesh of the second layer is woven and comprised of at least two layers of mesh material.

13. The protective cover as claimed in claim 1, wherein the mesh of the second layer comprises flexible mail armor made of a metal or of a metal alloy or of stainless steel.

14. The protective cover as claimed in claim 1, wherein the mesh of the second layer comprises a plurality of adjacent layers of mesh material.

15. The protective cover as claimed in claim 1, wherein the mesh of the second layer has a gauge of approximately two strands per centimeter.

16. The protective cover as claimed in claim 1, wherein the plurality of functional layers further comprises a fourth layer as an innermost liner layer comprised of a synthetic polymer and arranged adjacent to the third layer opposite the first layer.

17. The protective cover as claimed in claim 16, wherein the synthetic polymer is a polyamide.

18. The protective cover as claimed in claim 1, wherein the protective cover is configured to be substantially permanently affixed to a conduit assembly.

19. The protective cover as claimed in claim 1, further comprising a fastening assembly specifically configured to enable detachable removal of the protective cover from a conduit assembly.

20. The protective cover as claimed in claim 19, wherein the fastening assembly includes the third layer, wherein the third layer is an elongate sheet having opposed longitudinal edges, wherein the opposed longitudinal edges include means for releasably attaching the opposed longitudinal edges to each other along a length of the conduit assembly.

21. The protective cover as claimed in claim 20, wherein the means for releasably attaching the opposed longitudinal edges to each other comprises a hook and loop fixing arrangement.

22. The protective cover as claimed in claim 19, wherein the fastening assembly includes the first layer and the second layer that are configured such that the first layer is an elongate sheet comprising a first longitudinal region and the second layer comprises, at an outer surface thereof, a second longitudinal region opposite the first longitudinal region of the first layer, wherein the first longitudinal region of the first layer and the second longitudinal region of the second layer comprise means for releasably attaching the first longitudinal region of the first layer and the second longitudinal region of the second layer to each other along a length of the conduit assembly.

23. The protective cover as claimed in claim 22, wherein the first longitudinal region of the first layer comprises an edge of the first layer.

24. The protective cover as claimed in claim 22, wherein the means for releasably attaching comprises a hook and loop fixing arrangement.

25. The protective cover as claimed in claim 1, further comprising at least one strap configured to extend around a circumference of the protective cover, when the sleeve is formed.

26. The protective cover as claimed in claim 25, wherein the at least one strap comprises or is associated with a ratchet tightening mechanism.

27. The protective cover as claimed in claim 25, wherein the one or more attachment points in the form of the eyelet is provided at the at least one strap and wherein the flexible strand is an overhead wire.

28. The protective cover as claimed in claim 1, wherein the flexible strand is a wire located in a mine above the protective cover formed to the sleeve.

29. A conduit protection system comprising a protective cover as claimed in claim 1 and at least one conduit selected from the group consisting of a hydraulic hose, an electric power cable, and a communications cable.

30. A system for protecting one or more cables and/or hoses from matter falling from above in a mine, the system comprising:
at least one protective cover as claimed in claim 1, wherein the protective cover is suspended from a flexible strand attached to a fixed structure located substantially vertically above the one or more cables and/or hoses.

31. The system as claimed in claim 30, wherein the flexible strand is suspended from two points of the fixed structure.

32. The system as claimed in claim 30, wherein the fixed structure comprises at least one roof joist of the mine or a chock canopy.

33. The system as claimed in claim 30, wherein the flexible strand comprises the shape of a catenary.

34. The system as claimed in claim 30, wherein the flexible strand comprises a wire made of stainless steel.

* * * * *